(12) United States Patent
Sato et al.

(10) Patent No.: US 10,896,149 B2
(45) Date of Patent: Jan. 19, 2021

(54) COMPOSITION OPERATORS FOR SMART CONTRACT

(71) Applicant: International Business Machines Corporation, Armonk, NY (US)

(72) Inventors: Naoto Sato, Kawasaki (JP); Takaaki Tateishi, Yamato (JP); Shunichi Amano, Katsushika (JP)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/048,320

(22) Filed: Jul. 29, 2018

(65) Prior Publication Data

US 2020/0034448 A1    Jan. 30, 2020

(51) Int. Cl.
*G06F 16/13*    (2019.01)
(52) U.S. Cl.
CPC .................................. *G06F 16/134* (2019.01)
(58) Field of Classification Search
CPC ...................................................... G06F 16/134
USPC ................................................. 707/600–899
See application file for complete search history.

(56) References Cited

U.S. PATENT DOCUMENTS

| | | |
|---|---|---|
| 2018/0005186 A1 | 1/2018 | Hunn |
| 2018/0018738 A1 | 1/2018 | Bernauer et al. |
| 2018/0096360 A1 | 4/2018 | Christidis et al. |
| 2018/0183600 A1* | 6/2018 | Davis .................... G06F 16/951 |
| 2018/0227116 A1* | 8/2018 | Chapman .............. H04L 9/0643 |
| 2019/0334715 A1 | 10/2019 | Gray |
| 2019/0354723 A1 | 11/2019 | Dassenno |

OTHER PUBLICATIONS

List of IBM Patents or Patent Applications Treated as Related, May 1, 2018.
Naoto Sato, Smart Contract Input Mapping, U.S. Appl. No. 16/048,317, filed Jul. 29, 2018.
Naoto Sato, Automatic Generation of Smart Contracts, U.S. Appl. No. 16/048,322, filed Jul. 29, 2018.
Ahmed Bouchefra, Flattening Contracts and Debugging with Remix, Blockchain, SitePoint, Publisher: www.sitepoint.com, Please refer to p. 1.
Russell O'Connor, Simplicity: A New Language for Blockchains, 2017. Proceedings of the 2017 Workshop on Programming Languages and Analysis for Security. ACM, New York, NY, USA., Cornell University Library, Please refer to Abstract, p. 4, Section 1.3, p. 5, Section 2 and p. 25, Section 6.

* cited by examiner

*Primary Examiner* — Isaac M Woo

(57) ABSTRACT

An example operation may include one or more of identifying one or more input smart contracts, identifying a set of composition operations applicable to the one or more input smart contracts and contract specifications, combining the one or more input smart contracts using the set of composition operations, creating a composite smart contract based on the one or more input smart contracts and the set of composition operations, and translating the composite smart contract into an executable blockchain smart contract. The one or more input smart contracts, each includes a contract specification, the contract specification includes a regular event pattern and a temporal constraint the input smart contract must satisfy.

25 Claims, 17 Drawing Sheets

COMPOSITION OPERATORS FOR SMART CONTRACT

TECHNICAL FIELD

This application generally relates to a database storage system, and more particularly, to composition operators for smart contracts in blockchain networks.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by a lack of support for smart contracts, and therefore an inability to create new executable smart contracts from a protocol, properties, and rules. As such, what is needed is a solution to overcome these significant drawbacks.

SUMMARY

One example embodiment provides a system that includes a blockchain network and a computing system. The blockchain network includes one or more blockchain nodes which includes a smart contract. The computing system is configured to identify one or more input smart contracts, identify a set of composition operations applicable to the one or more input smart contracts and contract specifications, combine the one or more input smart contracts using the set of composition operations, create a composite smart contract based on the one or more input smart contracts and the set of composition operations, and translate the composite smart contract into an executable blockchain smart contract. Each input smart contract includes a contract specification. The contract specification includes a regular event pattern and a temporal constraint the input smart contract must satisfy.

Another example embodiment provides a method that includes one or more of identifying one or more input smart contracts, identifying a set of composition operations applicable to the one or more input smart contracts and contract specifications, combining the one or more input smart contracts using the set of composition operations, creating a composite smart contract based on the one or more input smart contracts and the set of composition operations, and translating the composite smart contract into an executable blockchain smart contract. The one or more input smart contracts each include a contract specification. The contract specification includes a regular event pattern and a temporal constraint the input smart contract must satisfy.

A further example embodiment provides a non-transitory computer readable medium comprising instructions, that when read by a processor, cause the processor to perform one or more of identifying one or more input smart contracts, identifying a set of composition operations applicable to the one or more input smart contracts and contract specifications, combining the one or more input smart contracts using the set of composition operations, creating a composite smart contract based on the one or more input smart contracts and the set of composition operations, and translating the composite smart contract into an executable blockchain smart contract. The one or more input smart contracts each include a contract specification. The contract specification includes a regular event pattern and a temporal constraint the input smart contract must satisfy.

Another example embodiment provides another method that includes one or more of identifying one or more input smart contracts, identifying a set of composition operations applicable to the one or more input smart contracts and contract specifications, combining the one or more input smart contracts using the set of composition operations, creating a composite smart contract based on the one or more input smart contracts and the set of composition operations, converting the composite smart contract to a deterministic finite automaton, and converting the deterministic finite automaton into an executable form of a blockchain smart contract. The one or more input smart contracts each include a contract specification. The contract specification includes a regular event pattern and a temporal constraint the input smart contract must satisfy.

A further example embodiment provides another non-transitory computer readable medium comprising instructions, that when read by a processor, cause the processor to perform one or more of identifying one or more input smart contracts, identifying a set of composition operations applicable to the one or more input smart contracts and contract specifications, combining the one or more input smart contracts using the set of composition operations, creating a composite smart contract based on the one or more input smart contracts and the set of composition operations, converting the composite smart contract to a deterministic finite automaton, and converting the deterministic finite automaton into an executable form of a blockchain smart contract. The one or more input smart contracts each include a contract specification. The contract specification includes a regular event pattern and a temporal constraint the input smart contract must satisfy.

DETAILED DESCRIPTION

Figure 1A:
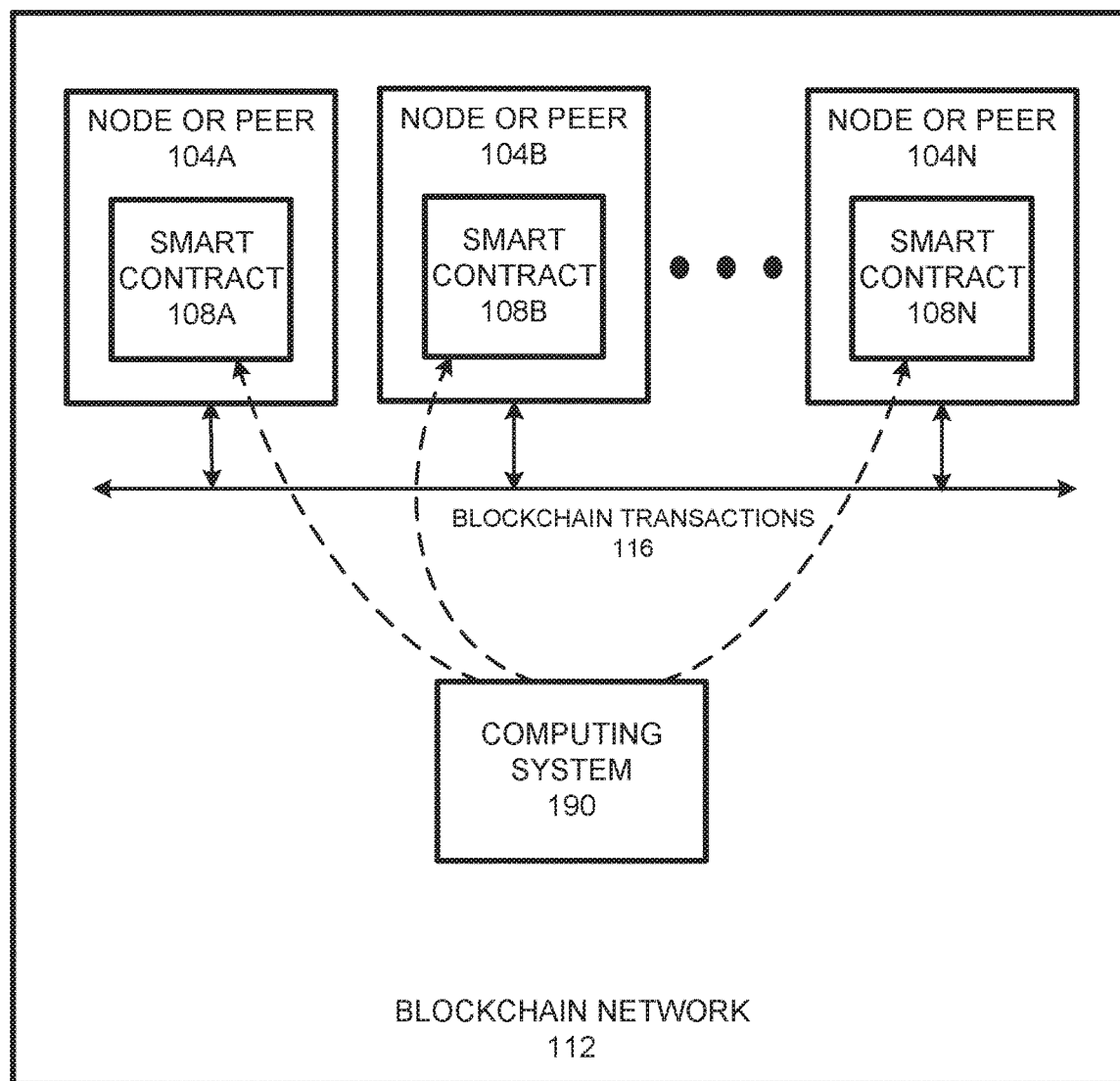
FIG. 1A illustrates a network diagram of a blockchain system including a database and smart contracts, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide input mapping used in the formation of Linear Dynamic Logic used to create blockchain smart contracts.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include improved smart contract formation and enforcement. Recently, despite the growing popularity of smart contracts, one serious concern is arising among both industry and academia, that is, whether they work autonomously without human intervention really as intended and, when that is uncertain, ensuring that contracts meet particular requirements. To resolve this, a new formal approach to smart contract development is described herein: instead of defining contracts just as programs in conventional languages, they should be defined using formal logic so that it is possible to verify whether they meet particular requirements, and enforce them if necessary. The primary challenge is that expressive formal logic often turns out to be undecidable and consequently executable programs cannot be generated. As a solution, each contract definition is divided into two layers, namely a specification layer in a decidable logic called Linear Dynamic Logic on finite traces ($LDL_f$) for verification and enforcement of requirements, and a rule layer for defining implementation details, while the consistency between the two layers is systematically guaranteed. Based on this, it also becomes possible to automatically generate executable contract programs from their formal specification, which leads to improving the trustworthiness of contracts. Evaluation on Hyperledger Fabric shows the feasibility and high effectiveness of this approach.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the improved smart contract formation and enforcement is implemented due to utilizing decidable logic called Linear Dynamic Logic on finite traces.

One of the benefits of the example embodiments is that it improves the functionality of a computing system by improving blockchain operation and functionality. Through the blockchain system described herein, a computing system can perform automated smart contract generation and requirement enforcement. New smart contracts may be assembled though various means described herein. For example, a new smart contract may be assembled from a protocol, properties, and rules, or from reusable smart contracts and a new requirements specification. A series of composition operators may also aid in the formation of new smart contracts.

The example embodiments provide numerous benefits over a traditional database. For example, through the blockchain the embodiments provide improved smart contract formation and requirement enforcement Meanwhile, a traditional database could not be used to implement the example embodiments because traditional databases do not support smart contracts or chaincodes. Accordingly, the example embodiments provide for a specific solution providing improved productivity, reusability, and correctness for smart contracts.

The example embodiments also change how data may be stored within a block structure of the blockchain. For example, event, transition, and state information that derive from SCXML may be stored within data blocks of a blockchain. By storing the event, transition, and state information within data blocks of a blockchain, the new data may be appended to an immutable ledger through a hash-linked chain of blocks. In some embodiments, the data block may be different than a traditional data block by including the event, transition, and state information that is used for smart contract formation of a blockchain.

While the idea is widespread, the term "smart contract" has no clear definition. Two different notions exist that apply to 'smart contracts': One is smart contract code, which is a piece of code written in a programming language that runs on a blockchain platform. The other is smart legal contracts. They are more than just codes, but are supposed to complement or replace existing legal contracts and to be legally enforceable as such. Taking this into account, existing efforts related to smart contract development are described.

Major blockchain platforms provide tools for smart contract development, which include compilers of contract programming languages. Bitcoin supports a Forth-like stack-based language without loops, called Script. It is Turing-incomplete and used mostly for digital signature verification. Ethereum was originally conceived to improve Bitcoin with a full-fledged programming language for application development. In addition to Solidity, it supports LLL, Serpent, and Mutan. They all run on Ethereum Virtual Machine (EVM). Corda is developed mainly for financial applications (at least initially), and its design choice is relatively conservative. It supports Java, and also Kotlin, another Java Virtual Machine language officially supported in the Android operating system. What differentiates Corda's smart contracts from others is that they can have legal proses attached to smart contract code so that one can refer to them in case of disputes. Hyperledger Fabric supports smart contracts written in the Go language, called chaincodes. Chaincodes are mostly similar to Ethereum smart contracts, except that they depend on Docker instead of virtual machine. From third parties other than blockchain platform providers, several new cross-platform languages have been proposed.

Among those, Simplicity is a strongly-typed combinatory-based low-level language that features analysis of resource usage on virtual machines including its own Bit Machine. Primarily owing to its Turing-incompleteness, temporal and spatial boundaries of resource use can be estimated by static means. Ergo is another strongly-typed functional language that has a platform-independent semantics. Similar to Simplicity, it also imposes a restriction on iterations and guarantees termination of contract execution.

One important feature that contract programming languages should support is verification of properties that hold against particular contracts. Solidity* is designed to be a dialect of Solidity. Contracts in Solidity* are translated into F* which is a ML-based language and allows to certify properties of programs using automatic and semi-automatic provers. Other contract programming languages include a domain-specific language (DSL) for defining financial contracts such as FX future, swap, option and other derivative contracts In the DSL, each contract is defined as a cash flow between parties that depend on stochastically fluctuating values, such as FX rates called observables, and can be composed of simpler contracts. It also has a type system that helps infer properties, such as causality of contracts. Although contracts in this DSL are not designed to run on blockchain platforms, it primarily addresses automation of financial transactions.

There exists a trend to regard smart contracts as smart legal contracts. In fact, some strongly advocate, primarily from a legal and accounting perspective, the concept of 'Ricardian contract' as a basis of smart contracts, according to which smart contracts are not just software programs for automatic transaction execution, but instead they should refer to legal contract agreements in a machine-readable format. Toward this direction, a trace-based contract model that incorporates 'blame assignment' may include a DSL based on the model. According to their formalism, each contract takes a trace (a sequence of events) and determines whether no contract breach is detected or a breach is caused by some particular party. They show that this encompasses various aspects of contracts including obligations, permissions, and reparation.

More recently, an ACCORD project has been launched, which aims to establish standards for smart legal contracts. The key concept proposed by the project is reusable domain-specific legal contract templates, each of which is defined as a triple of a data model for transactions, a document in a natural language that includes variables that may be instantiated to values defined in the data model, a set of code fragments that implement blockchain transactions. Template engines such as Cicero generate programs executable on either Hyperledger Fabric (HLF) or Ethereum Virtual Machine (EVM).

Next, it is useful to describe how smart contracts work on existing blockchain platforms such as Ethereum and Hyperledger Fabric, and describe which parts are addressed by the present application. From a high-level perspective, blockchain platforms commonly provide functionality to access transactional data stored in ledger database(s) which are either globally shared (Bitcoin/Ethereum/HLF) or distributed (Corda), invoke transactions, and add blocks. From the application point of view, these are regarded as API functions or virtual machine instructions.

Smart contracts are blockchain applications that are characterized by strong programmability (Turing completeness) and a high degree of autonomicity. In addition, it is often the case that smart contracts are defined without directly employing blockchain functionality, which are instead encapsulated beyond an abstraction layer. For example, smart contracts in Solidity look like C++ classes, each of which carries instance variables and method functions. These are, when declared in the public scope, mapped to state variables (stored in the 'storage' ledger) and transactions, respectively. There is no direct way of extending blocks within a Solidity program. A smart contract in Hyplerledger Fabric, which is called chaincode, is a software component with a particular interface written in Go, Java, or JavaScript. In the interface, the Invoke function is defined as an entry point of transactions. It takes a transaction name and an object that has functions to handle a ledger and events.

The present application describes a small $LDL_f$-based domain-specific language (DSL) to define contracts, in terms of requirement enforcement and automatic contract generation. The DSL itself is defined primarily for demonstrating the feasibility of the described technologies and thus is intentionally designed to be minimalistic. Primary building blocks of the DSL are contracts, each of which is defined as a tuple of protocol, properties, and rules. The first two (i.e. protocol and properties) constitute the high-level specification layer of the contract whereas the third (i.e. rules) constitutes the rule layer that includes implementation details. The formal syntax of the DSL is defined below. For examples, refer to the toggle switch contract and Safe Remote Purchase (SRP) contracts.

```
DSL Syntax (Table I):
contract        ::= protocol_decl property_decl rule_decl
protocol_decl   ::= protocol protocol ';' ';'
protocol        ::= event_name
                  | protocol ';' protocol
                  | protocol '+' protocol
                  | protocol '*'
                  | protocol '?'
```

| | -continued |
|---|---|
| property_decl | ::= property (ldl_formula ';' )+ |
| rule_decl | ::= rule (rule ',' )+ |
| rule | ::= except ? on event_name (',' event_name)* ( when condition ('{' code '}')? )? do action ('{' code '}')? |
| condition | ::= ldl_proposition \| '<' ldl_path '>' condition |
| action | ::= ensure ldl_proposition \| raise event_name \| preserve '(' var_name (',' var_name)* ')' \| action (',' action)+ |

Note the DSL syntax is defined in the Extended Backus-Naur Form (EBNF); those symbols in italic denote non-terminal symbols whereas those in bold and those quoted denote terminal symbols.

Protocol: Each protocol defines a regular-pattern of events to be processed by a contract using sequence (;), choice (+), loop (*), and test (?) operators. This is analogous to regular expressions defined as regular-patterns of characters.

Properties: Each property is defined as a $LDL_f$ formula. It specifies a temporal constraint that the contract needs to satisfy. Properties can include atomic propositions like $q_0$ and $q_1$ but cannot include event names. This is for separating out the event-processing part of the semantics $([[.]]_{proto})$ (Table III) from the other parts for simplicity. When more than one property is defined in a contract, they are meant to be connected conjunctively. The form "[[ ]]" can be regarded as a computer program (or procedure) that takes a contract as input and derives a single $LDL_f$ formula as output. For example, [[c]] denotes an output $LDL_f$ formula obtained by passing a contract c, as input, to the program.

Rules: Each rule is defined in the ECA (event-condition-action) style as a triad of an event, a condition formula, and a sequence of actions. It specifies how the contract reacts to a particular event. The condition part of a rule is defined as an $LDL_f$ formula. Note a temporal condition, when $<\rho>\phi$, examines, upon event arrival, whether the preceding event trace matches $\rho$ and $\phi$, holds in the current state. The action part is defined as a sequence of two sorts of unit actions, namely (a1) ensure $\phi$, action that ensures a proposition $\phi$, turns out to hold when the event processing is complete, and (a2) raise e action that raises an event e subsequently after processing the event that fires the rule. Meanwhile, for convenience, several shorthand expressions are utilized: (1) on $e_1, e_2$ . . . is a shorthand for on $e_1$ . . . followed by on $e_2$ . . . (2) except on $e_1, e_2$ means "on any event except $e_1$ and $e_2$". (3) do preserve (q, . . . ) means "none of q, . . . changes its value" and is equivalent with when q do ensure q in conjunction with when !q do ensure !q. Note !q denotes the negation of q.

Code: The condition and action parts of a rule can carry extra code for defining implementation details that do not directly appear in the non-code parts of the rule. Conceptually, each code part and its corresponding non-code part are respectively considered as a refinement and an abstraction of the other. For concreteness of discussion, JavaScript has been adopted for code definition, although technically the code is not restricted to any particular language.

Linear Dynamic Logic on finite traces ($LDL_f$) is an extension of Linear Temporal Logic on finite traces (LTL). The primary advantage of $LDL_f$ over LTL is that $LDL_f$ includes regular paths in formulas for specifying modality. For instance, [ ]$\psi$ (safety: a proposition $\phi$ always holds, or !$\phi$ never happens) and $\Diamond \phi$ (liveness: $\phi$ will eventually hold) in LTL are equivalently represented in $LDL_f$ as [true*]$\phi$ ($\equiv$!<true*>!$\phi$) and <true*>$\phi$. Further, $LDL_f$ also allows defining formulas like <(light_on; light_off)*>last which has no LTL equivalent but specifies that two (exclusive) states, light_on and light_off, alternate with each other through the end of computation, where last (=[true] false) is a formula that holds only at the end of a trace. Let A= {A; . . . } denote a set of atomic propositions. Then, the formal syntax of $LDL_f$ and its (trace-based) semantics are defined as shown in Table II, where $\pi=(\pi(0), \ldots, \pi(last))$, $\phi$ holds at the $i^{th}$ position of $\pi$.

The expressiveness of $LDL_f$ is strictly higher than LTL and its class as a language is exactly the same as the class of the regular language. As a consequence, instead of introducing regular modeling languages, separately from formula definition languages, such as Promela for the SPIN LTL model checker, $LDL_f$ can be directly used for defining models (contracts in our case). This lies as the underlying foundation of the domain-specific language (DSL).

$LDL_f$ Syntax (Table II):
| | |
|---|---|
| Temporal formula $\phi$ | ::= A \| '!' $\phi$ \| $\phi_1$ '&' $\phi_2$ \| '<' $\rho$ '>' $\phi$ |
| Atomic proposition A | ::= propositional variable |
| Propositional formula $\psi$ | ::= temporal formula without modality |
| Regular path $\rho$ | ::= $\psi$ \| $\phi$ '?' \| $\rho_1$ '+' $\rho_2$ \| $\rho_1$ ';' $\rho_2$ \| $\rho$ '*' |

Note those quoted characters in the above denote terminal symbols.

$LDL_f$ Semantics. The semantics of a $LDL_f$ formula $\phi$ is defined with respect to a finite trace $\pi$ and a position i at the trace as $\pi,i \models \phi$, which should be interpreted as: given a finite trace $\pi=(\pi 0, \ldots, \pi last)$, $\phi$ holds at the i-th position of $\pi$. Formally, the semantics is defined as follows:

| | |
|---|---|
| $\pi,i \models A$ | iff $A \in \pi(i) \subset A$ |
| $\pi,i \models !\phi$ | iff $\pi,i \models \phi$ does not hold |
| $\pi,i \models \phi_1 \& \phi_2$ | iff $\pi,i \models \phi_1$ and $\pi,i \models \phi_2$ |
| $\pi,i \models <\psi> \phi$ | iff i < last and $\pi$ (i) $\models \psi$ and $\pi,i +1 \models \phi$ |
| $\pi,i \models < \phi_1?> \phi_2$ | iff $\pi,i \models \phi_1$ and $\pi,i \models \phi_2$ |
| $\pi,i \models <\rho_1 + \rho_2> \phi$ | iff $\pi,i \models <\rho_1> \phi$ or $\pi,i \models <\rho_2> \phi$ |
| $\pi,i \models <\rho_1 ; \rho_2> \phi$ | iff $<\rho_1> <\rho_2>\phi$ |
| $\pi,i \models <\rho^*> \phi$ | iff $\pi,i \models \phi$, or i < last and $\pi,i \models <\rho> <\rho^*> \phi$ ($\rho$ is not of the form $\psi$?) |

Domain-specific language (DSL) Semantics: Each contract is defined by a protocol p, a set of properties $\Phi=\{(\phi 1, \phi 1, \ldots \}$, and a set of rules $R=\{r_1, r_2; \ldots \}$. For a contract $c=(p,\Phi,R)$, the semantics [[c]] are defined by its shallow-embedding into $LDL_f$ as follows:

$[[c]]=[[p]]proto \& A_{\phi \in \Phi}\phi \& \Lambda_{r \in R}[[R]]_{rule}$

Note that $A_{\phi \in \Phi}\phi$ and $\Lambda_{r \in R}[[r]]$ rule respectively denote the logical conjunction of $\phi$, that ranges over the elements of $\Phi$ and the logical conjunction of $[[r]]_{rule}$ where r ranges over the elements of R.

Protocol p to $[[p]]_{proto}$: Each event-processing operation is mapped to a single-step transition between $\pi(i)$ and $\pi(i+1)$ for some i, that is, processing of an event is an atomic operation in the semantics. In this regard, the following $LDL_f$ formulas are defined for representing how events are being processed at the current position of a trace:

idle is a proposition indicating no event has been processed at the current position of a trace.

done(e) indicates that an event e has just been processed through the transition between the preceding position and the current position. It turns out "idle" is equivalent with !done(e) for any e. Employing these formulas, each protocol p may be mapped to a corresponding $LDL_f$ path $[[p]]_{proto}$ as:

$$[[p]]_{proto} = \langle idle; proto2ldl(p)\rangle(last \& idle)$$

where the auxiliary proto2ldl function is defined as shown in Table III.

Properties $\Phi$ to $\Lambda_{\varphi \in \Phi}\Phi:\Phi=\{\varphi_1, \varphi_2, \ldots\}$ is straightforwardly mapped to the conjunction of the formulas in $\Phi$.

Rules R to $\Lambda_{r \in R}[[r]]$ roe: Each rule r in R is defined as a safety property (of the form $[true^*]\varphi$ as shown in Table III), where act(a) maps an action a to a $LDL_f$ formula as follows:

act (raise e)=<true>done (e)

act (ensure ψ)=ψ

For example, on toggle when_off do ensure_on is translated to:

$$[true^*](\langle\_off\ done(toggle)\rangle\text{-}\rangle\langle\_off(done(toggle)\ \&\_on))$$

$[[\bullet]]_{proto}$ and $[[\bullet]]_{rule}$ are defined as follows:

---

$[[p]]_{proto}$ = <idle ; proto2ld l(p)> (last & idle)
where proto2ldl(p) : protocol => $LDL_f$ path is defined as:
    proto2ldl(e) = done(e)
    proto2ldl(p; p') = proto2ldl(p); proto2ldl(p')
    proto2ldl(p + p') = proto2ldl(p) + proto2ldl(p')
    proto2ldl(p*) = (proto2ldl(p)) *
    proto2ldl(p?) = (proto2ldl(p))?
$[[\text{on e when } \psi \text{ do } a_1, a_2,\ldots]]_{rule}$
    = $[true^*]\ (\langle\psi\rangle\ done(e) \to \langle\psi\rangle\ (done\ (e)\ \&\ \Lambda_i\ act(a_i))$
$[[\text{on e when } \langle\rho\rangle\ \psi \text{ do } a_1, a_2,\ldots]]_{rule}$
    = $[true^*]\ (\langle\rho; \psi\rangle\ done(e) \to \langle\ \rho; \psi\rangle\ (done\ (e)\ \&\ \Lambda_i\ act(a_i))$
Table III $[[.]]_{proto}$ : protocol to $LDL_f$ formula AND $[[.]]_{rule}$ : rule to $LDL_f$ formula

---

Smart contracts 108 may be verified in a formal and static manner by means of converting them to $LDL_f$ formulas using $[[.]]$ and running a decision procedure for solving $LDL_f$ satisfiability. For example, given a contract c, we can verify whether:

1) c accepts input events in a particular protocol p,
2) c has a particular property $\varphi$, and
3) c is a 'refinement' (or 'specialization') of another contract c'.

Formal verification of these are equivalently reduced to the following $LDL_f$ verification:

1) Acceptance of a protocol p by c: $[[p]]_{proto}|=[[c]]$
2) Model checking of a property $\varphi$ over c: $[[c]]|=\varphi$
3) Contract refinement from c to c': $[[c']]|=[[c]]$

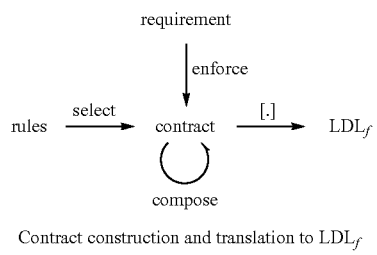

Contract construction and translation to $LDL_f$

Requirements can be formally enforced on contracts and the mechanism can be exploited for automatic contract generation. Each contract is defined as a tuple, or ordered list, of protocol, formulas, and rules. By separating out the first two of them, the following domains for contracts are defined as:

contract=specification×rules specification=protocol×properties requirement=specification rule=event×condition×action Note that for each of protocol, property, and rule, its default value may be defined, namely any*, true, and on any when true do ensure true, which work as identity elements for conjunction. To create a contract from a collection of rules, we first select particular rules, using some predicate, and fill in the default protocol and property values to promote it to a contract.

select:(rule→bool)→rules→contract

By passing a filter predicate f, select (f,R) yields (any*; {true}, {r∈R|f(r)}). For instance, f(e; c; a)=true (if e=$e_1$) or false (otherwise) is a filter for selecting the rules for the $e_1$ event.

Given a requirement $(p_1,\Phi_1)$ and a contract $c=(p_2,\Phi_2,R_2)$, we define enforcement of the requirement on c as another contract that is a variant of c with $(p_1,\Phi_1)$ enforced upon. Formally, the enforce function is typed as:

enforce: requirement→contract→contract and enforce$((p_1,\Phi_1), (p_2,\Phi_2,R_2))$ returns $(p_1 \cap p_2, \Phi_1 \cup \Phi_2, R_2)$ Note that $p_1$ intersection with $p_2$ is the intersection of protocols $p_1$ and $p_2$, while $\Phi_1$ union with $\Phi_2$ and $R_1$ union with $R_2$ denote conjunctive unions of formulas and rules, respectively. As a direct consequence of the definition, the following equation can be guaranteed to hold:

$$[[enforce((p_1,\Phi_1),c)]]=[[p_1]]_{proto}\ \&\ \Lambda_{\varphi \in \Phi_1}\varphi\&[[c]]$$

Note also, as a natural consequence, this implies that the requirement $(p_1,\Phi_1)$ is enforced on $c'=enforce((p_1,\Phi_1), c)]]$ in the sense of $[[c']]=[[p_1]]_{proto}\&\ \Lambda_{\varphi \in \Phi_1}\varphi$.

Next, a systematic means to compose contracts is provided. In so doing, assume that each contract $(p,\Phi,R)$ is of the form $(p, \{\langle\rho\rangle>last\},R)$ (i.e., $\Phi=\{\langle\rho\rangle(last)\}$). Note that each $LDL_f$ formula can be equivalently represented as $\langle\rho\rangle last$ for some $\rho$. Considering this and the fact that $\Phi=\{\varphi_1, \varphi_2; \ldots\}$ actually denotes $\Lambda_{\varphi \in \Phi}\varphi$, we can safely assume this without sacrificing generality.

a) Sequence $c_1$; $c_2$

Given $c_1=(p_1, \{\langle p_1\rangle>last\};R_1)$ and $c_2=(p_2, \{\langle\rho_2\rangle>last\},R_2)$, $c_1; c_2$ is composed by sequentially combining $c_1$ and $c_2$:

$c_1; c_2=(p_1; p_2; \{\langle\rho_1\theta_1; \rho_2\theta_2\rangle>last\}, R_1 \cup R_2)$, where:

$\theta_i=\{(\psi\& g_i)/\psi|\psi$ is a proposition in $\rho i\}$
$R_i'=\{(e, c\ \&\ g_i, a)|(e,c,a) \in R_i\}$ Note that $m_i$ denotes a substitution: $p_i\theta_i$ yields a regular path obtained by substituting each proposition $\psi$ that appears in $\rho_i$ with $\psi\&g_i$. Note also that $g_1$ and $g_2$ are guard formulas added to the path/rule parts of $c_1; c_2$ for distinguishing whether each of them originates from $c_1$ or $c_2$. For instance, by introducing fresh new atomic propositions $A_1$ and $A_2$, $g_1$ and $g_2$ can be defined as $A_1\ \&\ !A_2$ and $!A_1\ \&\ A_2$, respectively.

b) Choice $c_1+c_2$

Given $c_1$ and $c_2$ in the same way, $c_1+c_2$ is composed by disjunctively connecting $c_1$ and $c_2$:

$c_1+c_2=(p_1+p_2,\{\langle\rho_1\theta_1+\rho_2\theta_2\rangle>last\},R_1 \cup R_2')$ c) Loop c*

Given c=(p, {<ρ>last}, R), c* is composed by making a loop for repeating c for 0 or more times:

$$c^*=(p^*, \{<\rho^*>last\}, R)$$

Toggle Switch Example: A part of an example toggle switch contract is composed of two building-block contracts, which we here call $c_{on}$ and $c_{off}$, as $(c_{on}; c_{off})^*$. The only difference from the version described previously, which is obtained as a result of automatic contract generation, is that no property definition is included. The switch-alternation property is added to $(c_{on}; c_{off})^*$ by applying enforce to the switch specification.

SRP Seller and Buyer Example: The contract includes the following two sub-contracts: A Seller $c_S$: which receives a single 'purchase' event carries an atomic proposition denoted by _q0 that is set to false initially, and rules for 'purchase'. A Buyer $C_B$: which receives the subsequent events after 'purchase', carries _q1, _q2, and all the remaining rules. Therefore, $c_S$; $C_B$ defines a contract. The differences are the temporal property that is missing in $c_S$; $c_B$ and auxiliary propositions such as $A_1$ and $A_2$ that appear in $c_S$; $c_B$ but have no effect in this case. The original version provides an extra "abort" feature that is defined as follows:

```
event Aborted( );
function abort( ) public onlySeller inState(State.Created)
{
    emit Aborted( );
    state = State.Inactive;
    seller.transfer(this.balance);
}
```

In order to incorporate this into the contract, the Abort contract is defined, denoted by $c_{abort}$:

```
protocol abort ;;
property !_q3; // _q3 indicates 'inactive'
rule
    on abort when !_q3
    {_event.data.sender == _data.seller }
    do raise aborted, ensure _q3 // inactive
    { transfer(_data.seller, _data.balance); };
    except on abort do preserve (_q3);
Then, c_S; (c_B + c_abort) incorporates the feature.
```

Expressed in Solidity, the Safe Remote Purchase contract, without the "abort" feature, may be represented as shown below:

```
contract Purchase {
    uint public value;
    address public seller;
    address public buyer;
    enum State { Created, Locked, Inactive }
    State public state;
    function Purchase( ) public payable {
        seller = msg.sender;
        value = msg.value / 2;
        require((2 * value) == msg.value);
    }
    modifier condition(bool _condition) { require(_condition); _; }
    modifier onlyBuyer( ) { require(msg.sender == buyer); _; }
    modifier onlySeller( ) { require(msg.sender == seller); _; }
    modifier inState(State _state) { require(state == _state); _; }
    event PurchaseConfirmed( );
    event ItemReceived( );
    function confirmPurchase( )
    public
```

```
    inState(State.Created) condition(msg.value == (2 * value))
    payable
    {
        emit PurchaseConfirmed( );
        buyer = msg.sender; state = State.Locked;
    }
    function confirmReceived( )
        public onlyBuyer inState(State.Locked)
    {
        emit ItemReceived( );
        state = State.Inactive; buyer.transfer(value);
        seller.transfer(this.balance);
    }
}
```

Expressed in domain-specific language (DSL), the Safe Remote Purchase contract, without the "abort" feature, may be represented as shown below:

```
protocol
    purchase; confirmPurchase; purchaseConfirmed;
    confirmReceived; itemReceived ;;
property
    !_q0; // for seller. _q0 indicates its state is 'created'
    [true*] (!_q0 => !_q1 & !_q2);
rule
    on purchase // seller
    when !_q0 { _event.data.value % 2 = 0 }
    do ensure _q0 // created
    {
        pay (_event);
        _data.seller = _event.data.sender;
        _data.value = _event.data.value / 2;
    };
on confirmPurchase // buyer
when !_q1 & !_q2
{ _event.data.value == (2 * _data.value) }
do raise purchaseConfirmed, ensure _q1 & !_q2 // locked
    {
        pay (_event);
        _data.buyer = _event.data.sender;
    };
on confirmReceived // buyer
when _q1 & !_q2 // locked
{ _event.data.sender == _data.buyer }
do raise itemReceived, ensure !_q1 & _q2 // inactive
    {
        transfer (_data.buyer, _data.value);
        transfer (_data.seller, _data.balance);
    };
except on purchase do preserve (_q0);
except on confirmPurchase, confirmReceived do preserve (_q1, _q2);|
```

Based on the compositional contract construction now established, a contract may be semi-automatically generated contract(s) that meet a particular requirement, in which the non-automatic portion is an instantiation of guard formulas that appear as free variables in the composition operations. Specifically, given a set of contracts $C_0$ and a requirement $(p,\Phi)$, the following two-step procedure may be utilized to combine contracts in $C_0$ and generate another set of contracts $C_2$ each of which meets the requirement.

1) Construct, by combining contracts in $C_0$, a set of 'candidate' contracts $C_1$, each element of which carries a protocol p' that is equal with (or larger than) p. Note this involves a recursive operation described below:

$$c=(p',\Phi',R')\in C_1$$

$$\Leftrightarrow c \text{ is composed of } c_1; c_2; \ldots \text{ for some } c_i\in C_0$$

$$[[p]]_{proto}=[[p']]_{proto}$$

2) Enforce the requirement on the contracts in $C_1$ and filter out those that derive unsatisfiable $LDL_f$ formulas.

$$C_2=\{c'|c\in C_1, c'=\text{enforce}((p,\Phi),c), \exists \pi, 0 \models [[c']]\}$$

The key step is the construction of $C_1$, which is described in detail as follows: First, a set of sets of protocols P are constructed by recursively decomposing p in the following manner:

1) Initially, P is set to $\{\{p\}\}$
2) For each element $P=\{p1; p2; \ldots\}$ of P, if $p_i$ for some i is either of the form '$q_1; q_2$', '$q_1+q_2$', or '$q*$', add to P a new set of protocols P' obtained by replacing $p_i$ in P with '$q_1, q_2$', '$q_2$', or '$q$', respectively.
3) Terminate when there remains no room for P to expand.

Intuitively, each element P of P denotes a set of protocols from which we can compose p by using the 3 composition operators. Then, select those elements of P that are included in the protocols of $C_0$ ($\{P\in P|P\subset \{p(p,\Phi,R)\in C_0\}\}$). Note that each of those elements naturally indicates how to combine contracts in $C_0$, that is, if $\rho$ and p' in P derive from p; p' at the second step of the above recursive procedure, this indicates the corresponding contracts c and c' should be combined as c; c'. Taking this into account, we finally construct $C_1$ by combining contracts in $C_0$ exactly in the indicated manner.

For the toggle switch example, $C_0$ is initially set to $\{c_{on}, c_{off}\}$, from which $C_1=\{(c_{on}; c_{on})^*; (c_{on}; c_{off})^*, \ldots, (c_{off}; c_{off})^*\}$ is constructed. Then, by enforcing the requirement $(p;\Phi)$ and filtering out those derive unsatisfiable models, $C_2=\{\text{enforce}((p,\Phi), (c_{on}; c_{off})^*)\}$ is obtained as the result, where $\rho$ and $\Phi$ denote the protocol and the properties of the specification of the target contract, respectively. In the same way, the contract can be generated by calling the algorithm with $C_0=\{c_S, c_B\}$ and a specification.

A set of tools are described herein for running contracts in a domain-specific language (DSL) on Hyperledger Fabric: First, a contract definition in the DSL is translated to a semantically-equivalent UML statechart in a standardized SCXML format. Then, it is serialized into JSON and interpreted by the SCXML engine that runs within a chaincode process on HLF. In this section, the tool implementation is described, along with how the tools work. Additionally, some results of evaluation are also described.

Statechart Generation: Contract to Statechart

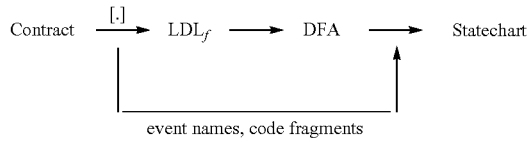

1) Contract to DFA: A contract is first translated into a $LDL_f$ formula, using [[.]] defined previously. It is translated to a deterministic finite automaton (DFA) that exactly accepts the traces for which the formula holds.

2) DFA to Statechart in SCXML: The generated DFA is then further translated into a UML Statechart by directly mapping its states and transitions to those for a (single flat) statechart. Meanwhile, the event names and code fragments that appear in the contract definition are kept separately and restored in the statechart generation. Note that event names are all translated to propositions by [[.]] and thus DFA does not retain the event names, whereas code fragments included in rules are all discarded by [[.]]. The tool for statechart generation attempts to find, for each state transition, which rule in the source contract corresponds with $\phi$. Specifically, this is done by running a $LDL_f$ model checker for each transition (q, e, q') and examining if there exists a rule (e, c, a) such that c and a hold at q and q', respectively. Once corresponding rule(s) are detected, the event names and the code fragments in the rules are attached to the transition.

The SCXML engine supports many important elements of SCXML including parallel and hierarchal states, event transmission, and data model and JavaScript execution. It is written in the "Go" language, and is designed to be used inside a chaincode, a smart contract of Hyperledger Fabric. Transactions to the chaincode are mapped to events of SCXML and recorded to a shared ledger. Since the chaincode cannot have persistent data, the states and the values of the data are managed by the SCXML engine and automatically stored into a Key-Value Store (KVS) which represents the current state of the blockchain system. This update on the KVS is recorded to the shared ledger. JavaScript programs are executed as actions or conditions using the Otto package (https://github.com/robertkrimen/otto) which is a JavaScript interpreter written in the Go language. Data of the statechart is handled using the JavaScript programs. In addition, a custom built-in JavaScript function enables accessing the KVS and sending custom events through the chaincode APIs (PutState, GetState and SetEvent) provided by Hyperledger Fabric where the custom events are user-defined events to be sent to a client program from a chaincode. Interactions for the confirmPurchase event are as follows:

1) A client requests a peer to process a transaction to send the event confirmPurchase with JSON data {"value": 10, "sender":"buyer"} to the statechart.
2) The peer calls the Invoke function of Chaincode, which receives the event name and the JSON data, to handle the transaction.
3) Chaincode sends the event with the JSON data to the SCXML engine.
4) After the SCXML engine receives the event, it retrieves the current state of the statechart and data stored in the KVS through chaincode APIs where, for example, the value associated with the key "value" in the KVS is assigned to the JavaScript variable _data.value.
5) The SCXML engine evaluates guard conditions to determine a transaction to fire where the value of "value" and "buyer" of the event data are assigned to the JavaScript variables_event.value and _event.buyer, respectively.
6) The SCXML engine executes an action. During this execution, the SCXML engine set the custom event purchaseConfirmed to be sent to the client through a chaincode API.
7) Update the current state.
8) The updated current state and the data are stored into the KVS.
9) The peer records the transaction to the shared ledger if it succeeds.
10) The custom event is sent to the client.

The performance of the SCXML engine has been evaluated by deploying the chaincode of the SRP example to Hyperledger Fabric running in the "dev" mode and collecting runtime profiling data using pprof. The "dev" mode is an execution mode of Hyperledger Fabric used during a development phase, where chaincode may be executed manually in a terminal window. In this experiment, a client first initialized the SCXML instance and sent the confirmPurchase event and the confirmReceived event while retrieving the current state and the data after each transaction. This scenario was repeated 20 times and cumulative times spent by the Invokefunction and its callee functions were collected. Two types of performance overhead that could not occur in commonly used chaincodes: (1) serialization and deserialization of states and data of SCXML for storing them in KVS and (2) preparation for the JavaScript execution, the greater part of which is consumed by the initialization of JavaScript interpreter and the data serialization for the communication between Go and JavaScript. The performance overhead may be reduced by developing a more efficient representation of states and data of SCXML and by writing actions and conditions in Go instead of JavaScript.

FIG. 1A illustrates a network diagram 100 of a blockchain system including a database and smart contracts, according to example embodiments. Referring to FIG. 1A, the network 100 includes a blockchain network 112, which may either be a public blockchain network 112 or a permissioned blockchain network 112. Blockchain network 112 includes a collections of nodes or peers 104, which operate together to create and process blockchain transactions 116. FIG. 1A illustrates three nodes or peers 104, identified as node or peer 104A and 104B through 104N. Although three nodes or peers 104 are shown, any number of nodes or peers 104 may be present in blockchain network 112.

Associated with nodes or peers 104 are smart contracts 108, identified as smart contract 108A associated with node or peer 104A, smart contract 108B associated with node or peer 104B, and smart contract 108N associated with node or peer 104N. A smart contract 108 is a computer application or protocol intended to digitally facilitate, verify, or enforce the negotiation or performance of a contract between two or more blockchain nodes or peers 104. Smart contracts 108 are expected to work highly automatically without human intervention as much as possible. However, it may be difficult to ensure that they work as specified due to their high expressiveness and complexity. Errors associated with smart contacts 108 could be serious because they often involve financial transactions. The present application describes various embodiments providing automatic generation of smart contracts 108 from a formal specification. Given one or more formal specifications (or requirements) of a smart contract 108, it is possible to generate a smart contract 108 that meets the specification in an automated manner. It is also possible to formally verify whether a specification holds against a generated smart contract 108. The present application further describes methods for combining and reusing smart contracts 108 to form new smart contracts 108, as well.

Smart contracts 108 of the present application are created on computing systems 190 known in the art. In one embodiment, computing systems 190 are part of blockchain network 112. In another embodiment, computing system 190 is outside the blockchain network 112. In yet another embodiment, computing system 190 is a node or peer 104 within the blockchain network 112.

Smart contracts 108 are, in essence, autonomous computer programs whose operations are mapped to blockchain transactions. In recent years, new programming languages have been created to build executable smart contracts 108, such as Solidity, Kotlin (API for Corda), and Script. Unfortunately, although smart contracts 108 in these languages work in a highly autonomous manner without human intervention, they are often error-prone. That is, they may be very difficult to ensure that they work as intended due to their high expressiveness and complexity. Consequences of unexpected errors could be serious because they often involve financial transactions. The present application provides various formal or automatic means for enforcing requirements on smart contracts 108: Given a smart contract c 108 and its requirements, commonly defined using formal logic, it should be possible to automatically generate another smart contract c' 108 that is similar to c but is more restricted so that it meets the requirements.

Further, based on this technology, automatic generation of smart contracts 108 from formal specification of their requirements is described. Thus, by combining these, the entire process of contract generation will be based on solid formal grounds: Starting from a formal specification of a contract, an executable contract is automatically generated, on which extra requirements can be further enforced arbitrarily. The primary challenge in attaining these goals is that there exists a tradeoff between the expressiveness of underlying formalism and the feasibility of automation: If an expressive formal language is used for contract definition, it is often the case that executable contract programs cannot be automatically generated. This is because automatic requirement enforcement and contract generation involves satisfiability solving in underlying formal logic, which could be decidable or undecidable, and higher expressiveness leads the logic to turning into being undecidable. Consequently, for automation, the expressiveness of specifications needs to be restricted substantially. This could end up with severe compromises.

Two-layered composable contracts provide such a solution. First, each contract definition is divided into two layers, namely a specification layer in a formal language based on a decidable logic called $LDL_f$ and a rule layer in both $LDL_f$ and a programming language such as JavaScript. The former specifies the transaction protocol and logical properties of a smart contract 108 whereas the latter defines implementation details of the transactions. As a key characteristic, the two layers need not be related directly but can be defined separately and then combined together. Regardless of how the two layers of a contract are defined, the contract as an executable program always meets what are defined in its specification layer as long as the definition is consistent (as an $LDL_f$ formula), that is, invalid combinations lead to logical inconsistency and derive no contract program. Exploiting this characteristic, given a contract, separately defined extra requirements may be combined or included into the specification layer of the contract (requirement enforcement).

Secondly, composition operations are newly provided for both contract specifications and full-fledged contracts. If contracts have consistent specifications, composition of them preserves consistency. In another sense, contract consistency is closed under composition. Based on this, an algorithm for automatic contract generation is presented: Given a contract specification and a set of contracts as building blocks, a new contract that conforms to the specification can be composed of the building block contracts by only referring to their specification layers (automatic contract generation). Note that all operations within specification layers, including both enforcement and composition, make no negative impact on the feasibility of automation, which is a key concept of the present application.

As an example of automatic contract generation, consider the following 'toggle switch' contract. Suppose there are small contracts that respond to a single 'toggle' event—one turns on a switch and the other turns it off, and they also change the internal switch state to 'on' and 'off', respectively. Then, suppose further that a new contract is needed that responds to an even number of consecutive toggle events and alternates the switch state accordingly. The two contracts and the above specification of the target contract are defined in a domain-specific language (DSL) as follows:

```
[2 building-block contracts]
protocol toggle ;; |// single 'toggle' transaction event
rule on toggle do ensure _on { turn_on ( ); }; // ECA rule with JavaScript
protocol toggle ;;
rule on toggle do ensure _off { turn_off ( ); };
[Specification of the target contract]
protocol (toggle; toggle)* ;; // even number of 'toggle' events
property // LDL_f formulas
<(_off; _on)*> last; // alternation of the 'off' and 'on' states
[true*] !(_on & _off); // 'on' or 'off' holds exclusively
```

Assuming these as inputs, the algorithm automatically generates the following contract by combining the building-block contracts, only using composition operators, and enforcing the properties defined in the specification. Note A1 and A2 are fresh atomic propositions introduced for keeping consistency:

```
protocol (toggle; toggle)* ;;
property
  <(!_on & _off & A1 & !A2; !_off & _on & ! A1 & A2)*> last;
rule
  on toggle when A1 & !A2 do ensure _on { turn_on ( ); };
  on toggle when !A1 & A2 do ensure _off { turn_off ( ); };
```

It is guaranteed that the generated contract is consistent and meets the specification. The contract is then translated into a single $LDL_f$ formula, which, together with the JavaScript code fragments attached to the rule actions, derives a final contract program that is executable on a blockchain platform. The novelty of the present application includes the following:

(1) Contract formulation: Each smart contract is defined as a tuple of protocol, properties, and rules, the first two of which constitute the specification layer of the contract whereas the third constitutes the rule layer. Most notably, these are formulated in a modular manner based on the separation-of-concern principle, that is, the protocol (event-based) and the properties (state-based) of a contract can be defined separately and so can the two layers. This modularity leads to providing a simple and clear formal semantics for contracts based on $LDL_f$.

(2) Requirement enforcement: As a direct consequence of the separation, it turns out requirements can be enforced on a contract straightforwardly by simply adding them to its specification layer.

(3) Composition: A set of contract composition operations are introduced which preserve contract consistency (closure property), that is, given consistent contracts $c_1$ and $c_2$, composite contracts such as $c_1; c_2$ and $c_1+c_2$ are consistent as well. This allows one to focus on the specification layers of contracts upon composition.

(4) Automatic contract generation: An algorithm to automatically generate a contract that meets a particular specification is produced by combining existing contracts.

(5) Domain-Specific Language (DSL): For demonstrating the effectiveness of this approach, a DSL and a set of tools have been developed that feature the above functionalities. Contracts defined in the DSL can be translated into contract programs (chaincodes) that are executable on Hyperledger Fabric (HLF), for example.

Figure 1B:
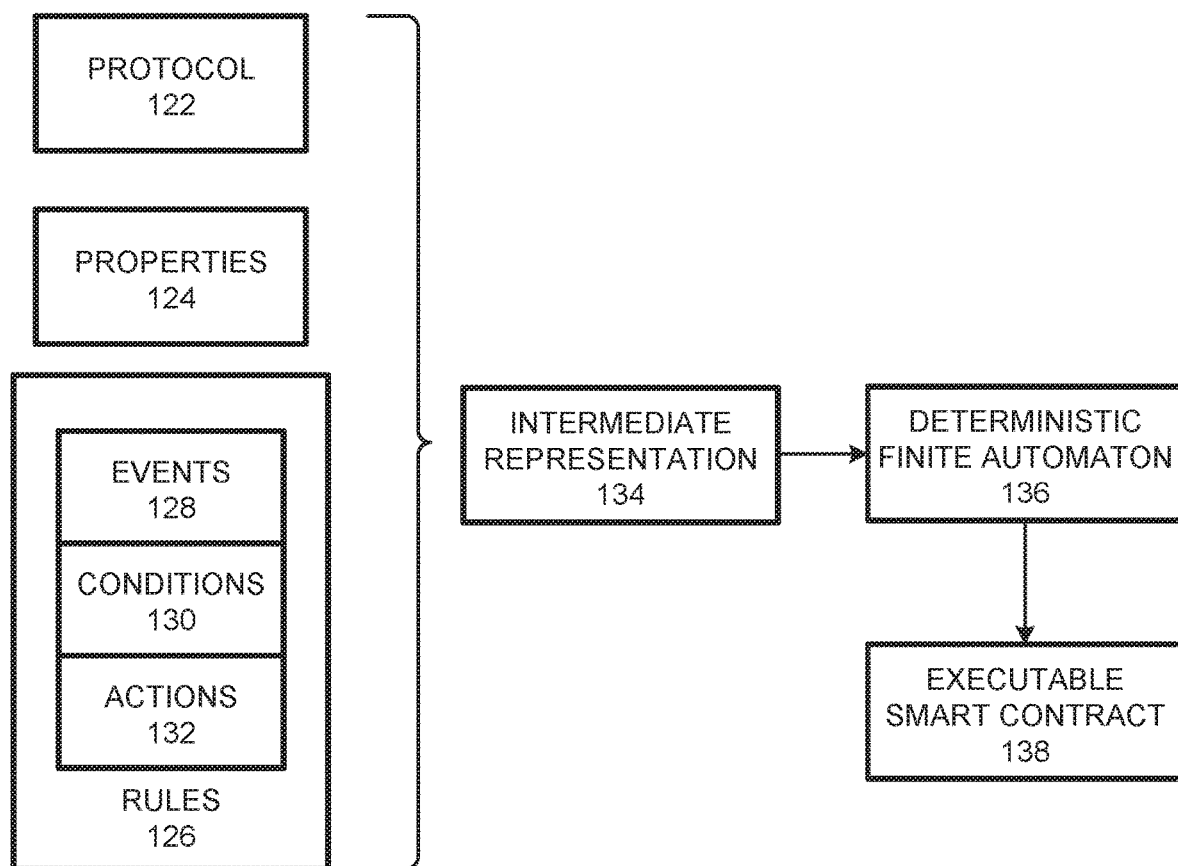
FIG. 1B illustrates a diagram of components operating with smart contracts and a database, according to example embodiments.

FIG. 1B illustrates a diagram 120 of components operating with smart contracts and a database, according to example embodiments. FIG. 1B illustrates components of a new smart contract 108. Referring to FIG. 1B, the components include a protocol 122, properties 124, and rules 126 (however, rules 126 may be empty). The protocol 122 is a regular pattern of events, which is a group of one or more sequences or occurrences related to blockchain transactions 116. Properties 124 include one or more Linear Dynamic Logic on finite traces ($LDL_f$) formulas. Rules 126 include an ordered list, where each entry in the list is an event 128, a condition 130, and a sequence of one or more actions 132. $LDL_f$ and preceding representations such as LTL are described in a paper "The Rise and Fall of LTL" by Moshe Y. Vardi of Rice University (https://www.cs.rice.edu/~vardi/papers/gandalf11-myv.pdf).

The rules 126 include a list, where each entry in the list is an event 128, a condition 130, and a sequence of actions 132. In one embodiment, one or more blockchain nodes or peers 104 combines the protocol 122, properties 124, and rules 126 into an intermediate representation 134 in Linear Dynamic Logic on finite traces ($LDL_f$).

A computing system 190 converts the intermediate representation 134 into a deterministic finite automaton (DFA) 136. A deterministic finite automaton (DFA) 136, also known as a deterministic finite acceptor (DFA), a deterministic finite state machine (DFSM), or a deterministic finite state automaton (DFSA)—is a finite-state machine that accepts or rejects strings of symbols and only produces a unique computation (or run) of the automaton for each input string. Deterministic refers to the uniqueness of the computation. A DFA is defined as an abstract mathematical concept, but is often implemented in hardware and software for solving various specific problems. For example, a DFA 136 can model software that decides whether or not online user input such as email addresses are valid. DFAs 136 recognize exactly the set of regular languages, which are useful for doing lexical analysis and pattern matching.

The computing system 190 also converts the deterministic finite automaton (DFA) 136 into an executable smart contract 138. In one embodiment, the executable smart contract 138 is in a State Chart Extensible Markup Language (SCXML) format. SCXML is an XML-based markup language that provides a generic state-machine-based execution environment based on Harel statecharts. A variant of Harel statecharts has gained widespread usage as part of the Unified Modeling Language (UML) The diagram type allows the modeling of superstates, orthogonal regions, and activities as part of a state. SCXML is able to describe complex finite state machines. For example, it is possible to describe notations such as sub-states, parallel states, synchronization, or concurrency in SCXML. Instead of SCXML, one may instead generate a JavaScript-only smart contract program that can be directly executed on the Hyperledger Platform. Other representations in Solidity, Go, etc could also be supported by slightly modifying the current DFA-to-SCXML translator to DFA-to-JS/Solidity/Go.

Figure 1C:
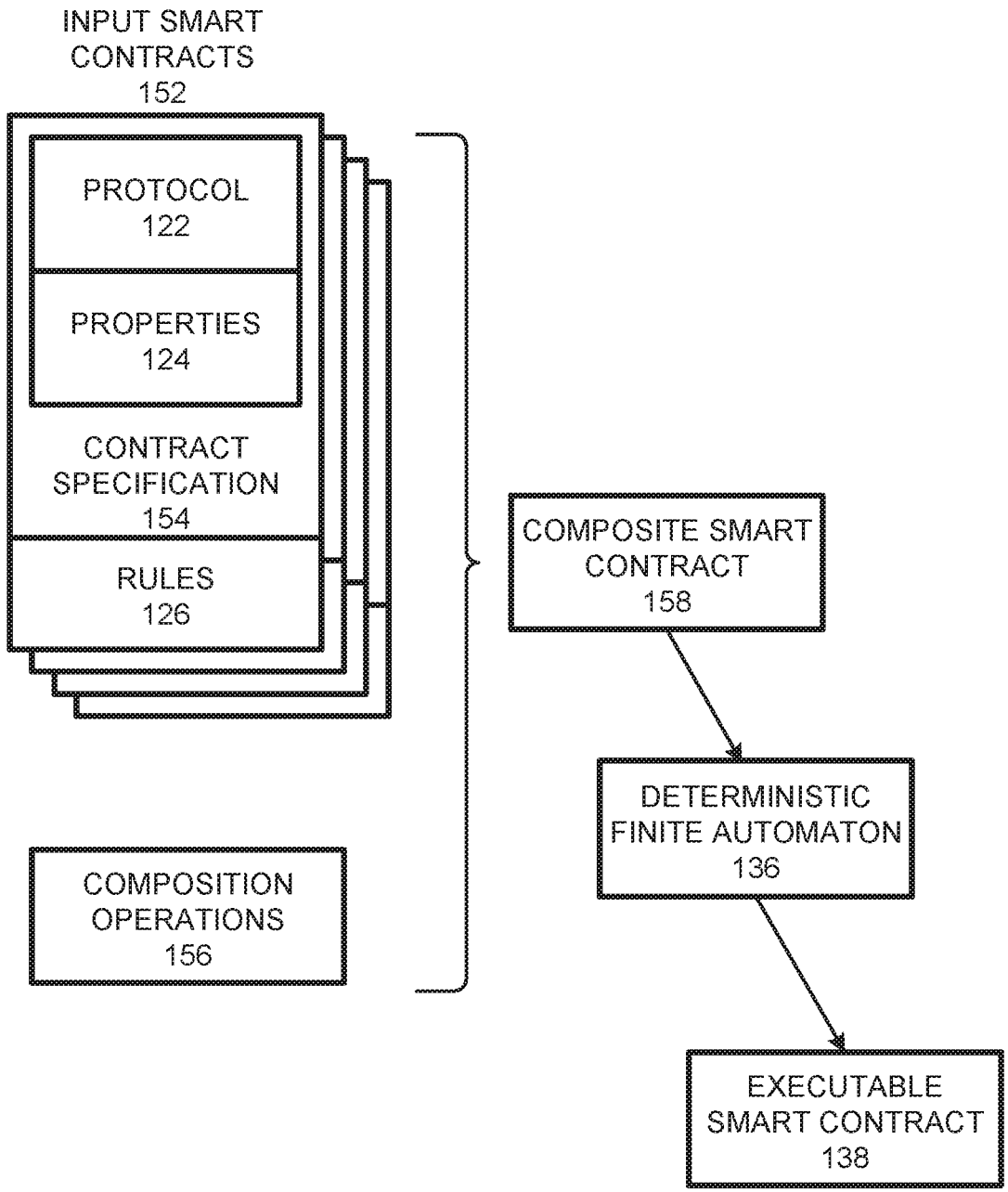
FIG. 1C illustrates a diagram of components operating with smart contracts and a database, according to example embodiments.

FIG. 1C illustrates a diagram 150 of components operating with smart contracts 108 and a database, according to example embodiments. Referring to FIG. 1C, the components include a set of input smart contracts 152, each of which includes a contract specification 154 and rules 126. The contract specification 154 for each input smart contract 152 includes a protocol 122 and properties 124.

Three composition operations 156 are defined and previously described—Sequence, Choice, and Loop. A computing system 190 combines the input smart contracts 152 using specified composition operations 156 to form a composite smart contract 158.

The computing system 190 then converts the composite smart contract 158 into a deterministic finite automaton (DFA) 136.

The computing system 190 then converts the deterministic finite automaton (DFA) 136 into an executable smart contract 138.

Figure 1D:
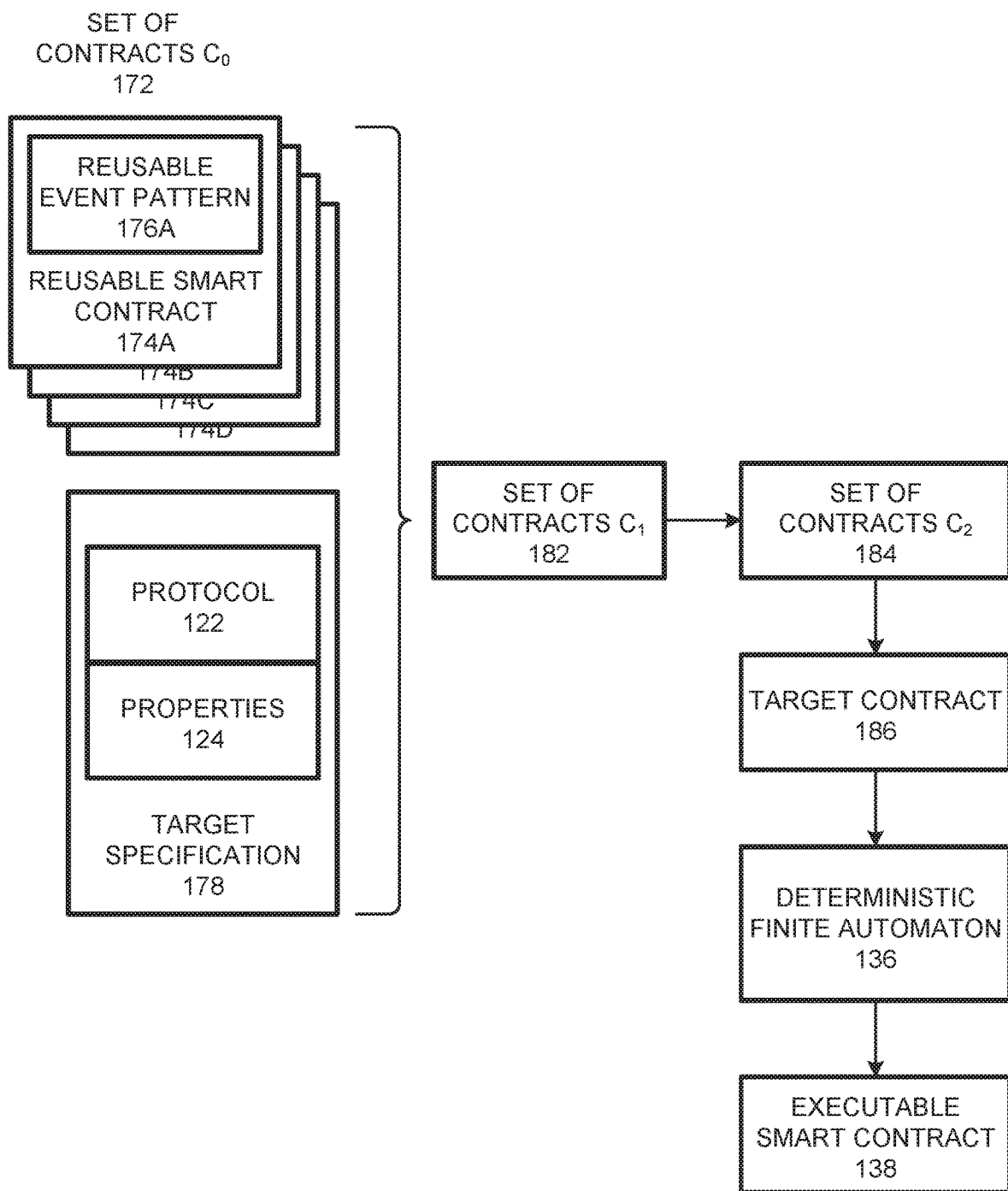
FIG. 1D illustrates a diagram of components operating with smart contracts and a database, according to example embodiments.

FIG. 1D illustrates a diagram 170 of components operating with smart contracts and a database, according to example embodiments. Referring to FIG. 1D, the components include a set of contracts $C_0$ 172, each of which is a reusable smart contract 174. Four reusable smart contracts 174 are shown, identified as reusable smart contract 174A-174D. Each reusable smart contract 174 has a reusable event pattern 176, identified as reusable event patterns 176A-176D.

The system also includes a target specification 178, which includes a protocol (regular event pattern) 122 and properties (formulas) 124.

The reusable smart contracts 174 and the target specification 178 are combined by a computing system 190 to form a set of contracts $C_1$ 182. The set of contracts $C_0$ 172 are combined using composition operators 156 as described with reference to FIGS. 1C and 5B. For each derived contract in the set of contracts $C_1$ 182, its protocol 122 is equal to or larger than p. In another sense, a contract $c=(p',\Phi',R')$ is an element of the set of contracts $C_1$ 182 if and only if the following holds:

c is composed of $c_1, c_2, \ldots$ for some $c_1$ that is an element of the set of contracts $C_0$ 172 Protocol p' includes p, that is $[[p]]_{proto}=[[p']]_{proto}$ Given protocol 122 and properties 124 (p,$\Phi$) and the set of contracts $C_0$ 172, a set of sets of protocols P is constructed by recursively decomposing p in the following manner:
a. Initially P is set to $\{\{p\}\}$
b. For each element $P=\{p_1, p_2, \ldots\}$ of P,
if $p_i$ for some i is either of the form '$q_1; q_2$','$q_1+q_2$', or '$q*$', we add to P a new set of protocols P' that is obtained by replacing", in P with '$q_1,q_2$', '$q_1,q_2$', or '$q$', respectively. (P:=P $\cup$ {P'}).
This step repeats recursively.
c. Terminate when there remains no room for P to expand.

Note that each element of P of P denotes a set of protocols from which p may be composed by using the three composition operations 156. The way P is constructed naturally indicates how to compose p from the protocols in P.

Next, contracts $c_1, c_2, \ldots, c_n$ are selected from the set of contracts $C_0$ 172, if there exists $P=\{p_1, p_2, \ldots, p_n\}$ in P such that the protocols of the contracts, denoted by $q_1, q_2, \ldots, q_n$, match with P in the sense that $q_i$ is equal to or larger than $p_i$ for any i=1, ..., n. (i.e., $[[p_i]]_{proto}=[[q_i]]_{proto}$).

Contracts $c_1, c_2, \ldots$ are combined to compose a contract in the exactly same way as combining $p_1, p_2$, to compose p, and add the resulting composite contract to $C_1$ ($C_1$ is initially set to empty). The steps in this and the previous paragraph are repeated until there remains no room for $C_1$ to grow further.

On each contract in the set of contracts C i 182, the target specification 178 is enforced. Following successful enforcement, the computing system converts the set of contracts $C_1$ 182 into a set of contracts $C_2$ 184. This step enforces the requirements on the set of contracts $C_1$ 182 and filters out those that derive an unsatisfiable $LDL_f$ formula.

$C_2=\{c'|c\in C_1, c'=\text{enforce}((p,\Phi),c), \exists \pi \text{ such that } \pi,0|= [[c]]\}$ From the set of contracts $C_2$ 184, one contract is selected to be a target contract 186. The target contract 186 is then converted by the computing system 190 into deterministic finite automaton 136, which was discussed previously with respect to FIG. 1A and accompanying description. Once expressed as deterministic finite automaton 136, the computing system 190 produces an executable smart contract 138.

Figure 2:
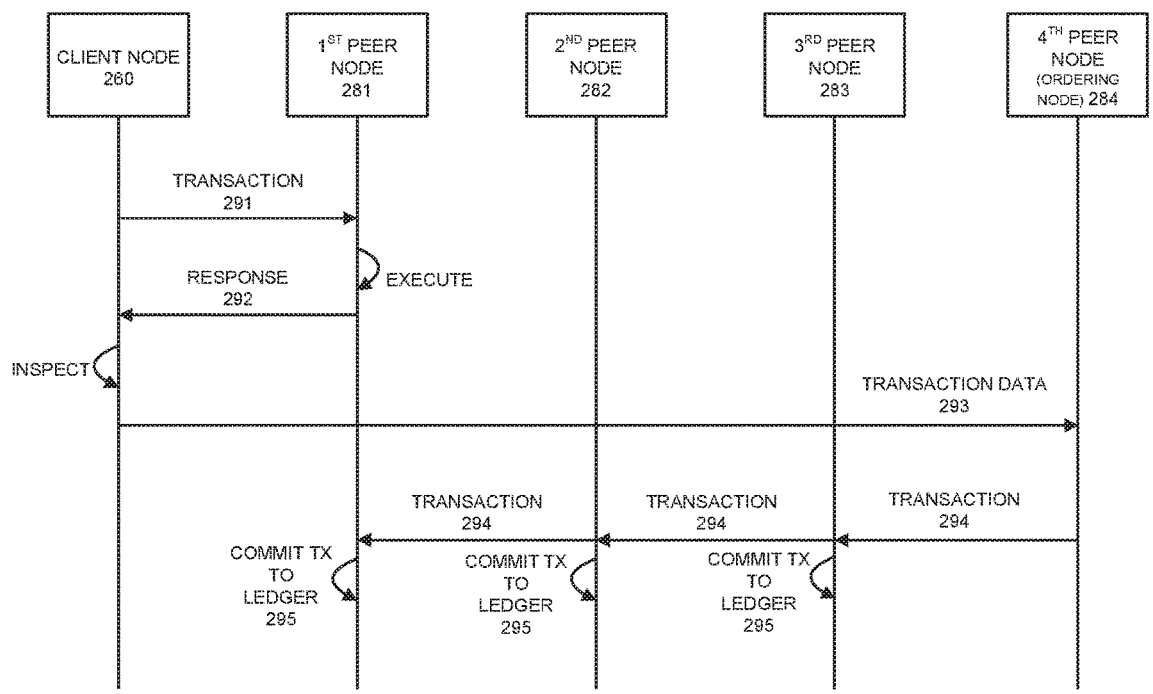
FIG. 2 illustrates an example of a transactional flow between nodes of a blockchain, according to example embodiments.

FIG. 2 illustrates an example of a transactional flow 200 between nodes of the blockchain in accordance with an example embodiment. Referring to FIG. 2, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
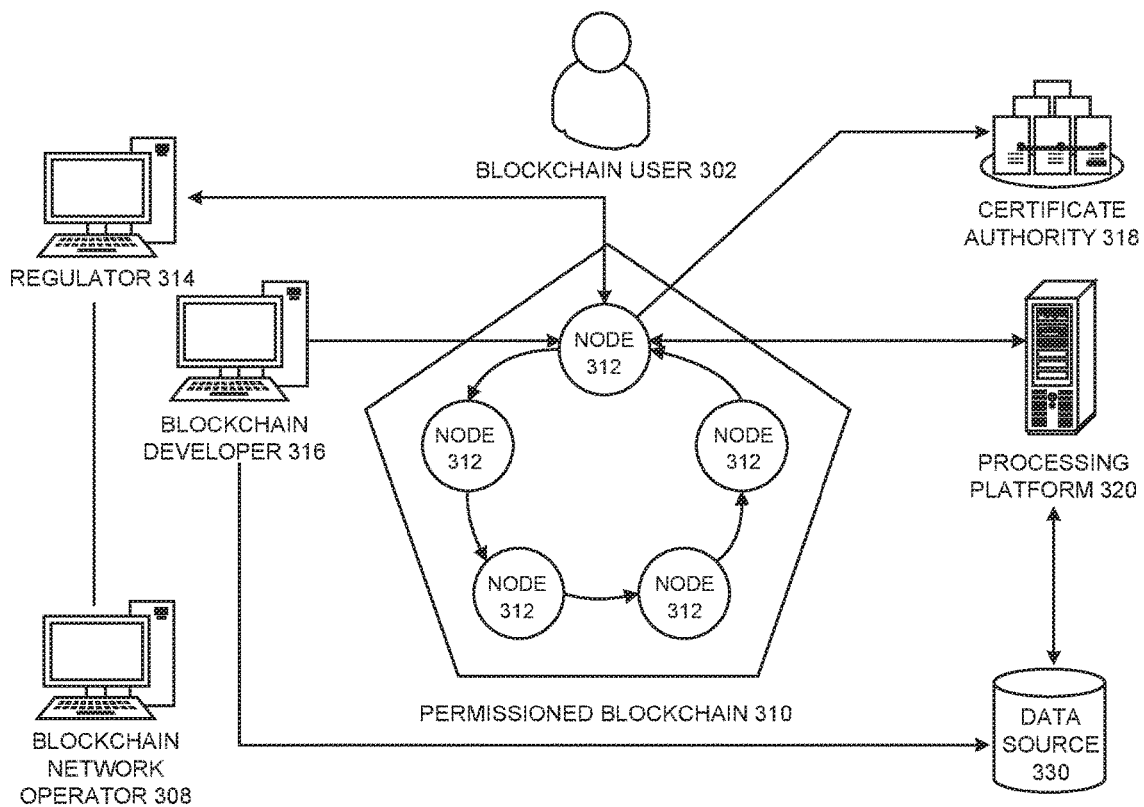
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
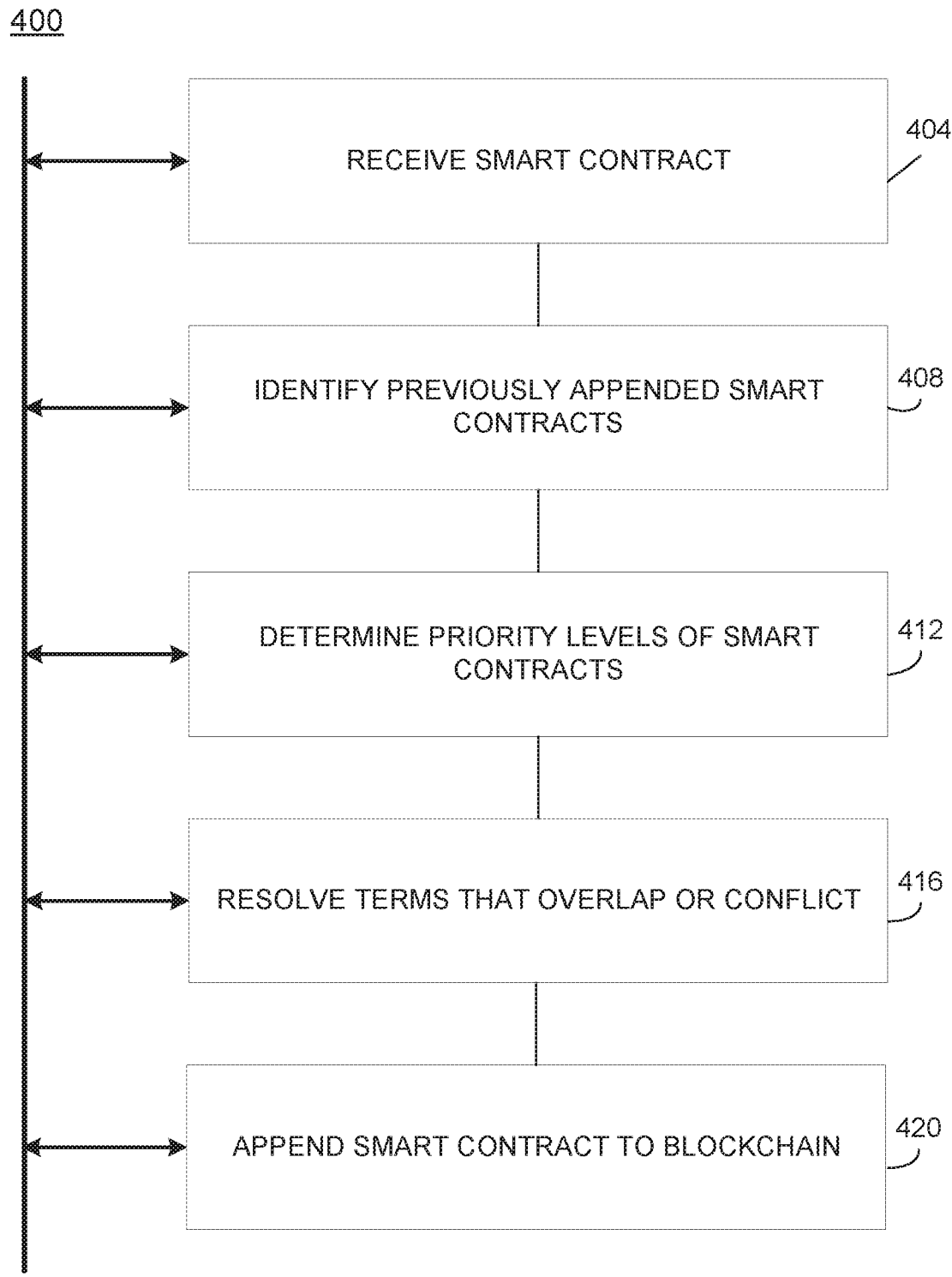
FIG. 4 illustrates a flow diagram of an example method of enforcing a smart contract execution hierarchy in a blockchain, according to example embodiments.

FIG. 4 illustrates a flow diagram 400 of an example method of enforcing a smart contract execution hierarchy in a blockchain, according to example embodiments. The method may include one or more of the following steps. In some aspects, all or a portion of the method 400 may be performed by various parts of the system At block 404, a new smart contract is received, for example, by a validator node or node associated with blockchain network 112.

At block 408, a node in the blockchain network 112 identifies any previously appended smart contracts by examining the blockchain. Previously appended smart contracts may be stored in previously committed blocks of the blockchain.

At block 412, a priority assignment subsystem within the blockchain network 112 determines priority levels for the received smart contract in block 404 and any previously appended smart contracts identified in block 408. If the new smart contract does not have a priority level, the priority assignment subsystem assigns a default priority level. In some embodiments, a prioritization and resolution subsystem may compare the priority level of the new smart contract to the priority level of a smart contract previously appended to the blockchain. The prioritization and resolution subsystem may determine whether the new smart contract has a lower priority than the previously appended smart contract.

At block 416, if the prioritization and resolution subsystem determines that the new smart contract has a lower priority than the previously appended smart contract, the priority examination subsystem may examine and compare the terms of the new smart contract and the previously appended smart contract. The priority examination subsystem may determine whether any of the terms of the new smart contract overlap or conflict with the terms of the previously appended smart contract. If the terms do not overlap or conflict, the method may proceed to block 420. If one or more of the terms do overlap or conflict, the prioritization and resolution subsystem may remove or modify the overlapping or conflicting terms from the new smart contract. Finally, at block 420, the new smart contract is appended to the blockchain.

Figure 5A:
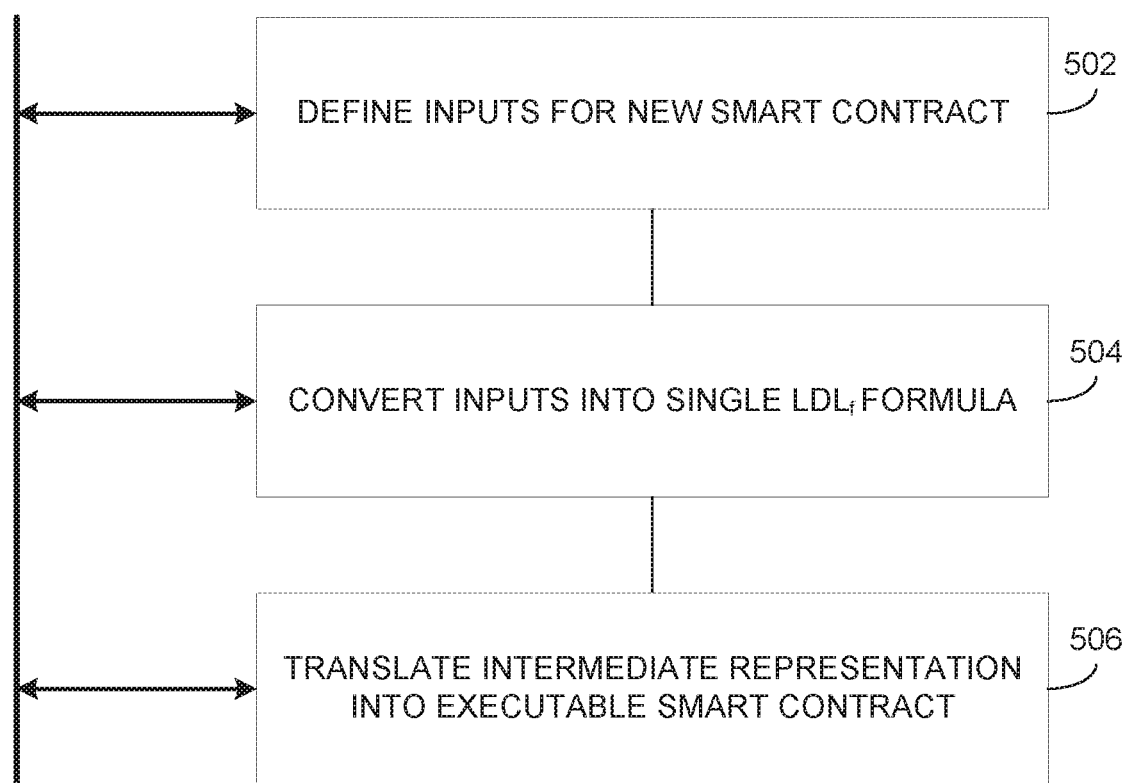
FIG. 5A illustrates a flow diagram of an example method of executable smart contract generation in a blockchain, according to example embodiments.

FIG. 5A illustrates a flow diagram of an example method of executable smart contract generation in a blockchain, according to example embodiments. Referring to FIG. 5A, the method 500 may include one or more steps as described herein and with respect to FIG. 1B.

At block 502, the method 500 may include defining inputs for a new smart contract 138. The inputs may include a regular event pattern (protocol 122), one or more formulas that each includes a temporal constraint the smart contract must satisfy (properties 124), and a list of entries. Each entry of the list includes an event 128, a condition 130, and a sequence of one or more actions 132.

At block 504, the method 500 may include converting the inputs into a single Linear Dynamic Logic formula. In one embodiment, the Linear Dynamic Logic formula is a Linear Dynamic Logic on finite traces formula ($LDL_f$). The single $LDL_f$ formula is a conjunction ("AND") of 3 $LDL_f$ formulas—one for the protocol 122, one for the properties 124, and a third for the rules 126.

The expressiveness of $LDL_f$ is strictly higher than LTL and its class as a language is exactly the same as the class of the regular language. "Expressiveness" here means that $LDL_f$ formulas can include sequences, choices, and loops of propositions, which its predecessor LTL did not allow.

Each regular pattern of events (which is a protocol 122) is included within a contract definition representing one or more event sequences that the contract can process. Each single event corresponds to a blockchain transaction 116 such as "purchase item", "send invoice", "ship item", etc. For example, consider 3 events: "purchase", "invoice", and "ship" events. A protocol 122 (regular pattern of events) may be defined as "purchase; ((invoice; ship)+(ship; invoice))", which means "the first event (transaction) must always be "purchase". "Purchase" is subsequently followed by either "invoice; ship" or "ship; invoice". In the former, invoice precedes ship, and in the latter, ϕ's the opposite. Consequently, "purchase; ((invoice; ship)+(ship; invoice))" may include 2 event sequences: namely (1) purchase, invoice, ship, and (2) purchase, ship, invoice.

At block 506, the method 500 may include translating the $LDL_f$ representation into an executable smart contract 138. An executable smart contract 138 is able to be directly executed by a blockchain node 104 of the blockchain network 112. In the preferred embodiment, the executable smart contract 138 is in a State Chart Extensible Markup Language (SCXML) format. In other embodiments, the executable smart contract 138 is in a wide variety of languages including Solidity and Go. Solidity is a statically-typed programming language designed for developing smart contracts that run on Ethereum Virtual Machine (EVM) platforms. Solidity is compiled to bytecode that is executable on the EVM, and developers are able to write applications that implement self-enforcing business logic embodied in smart contracts, leaving a non-repudiable and authoritative record of transactions. Go (often referred to as Golang) is another programming language that may be combined with Javascript and is designed to be used inside a chaincode (smart contract) of Hyperledger Fabric.

Figure 5B:
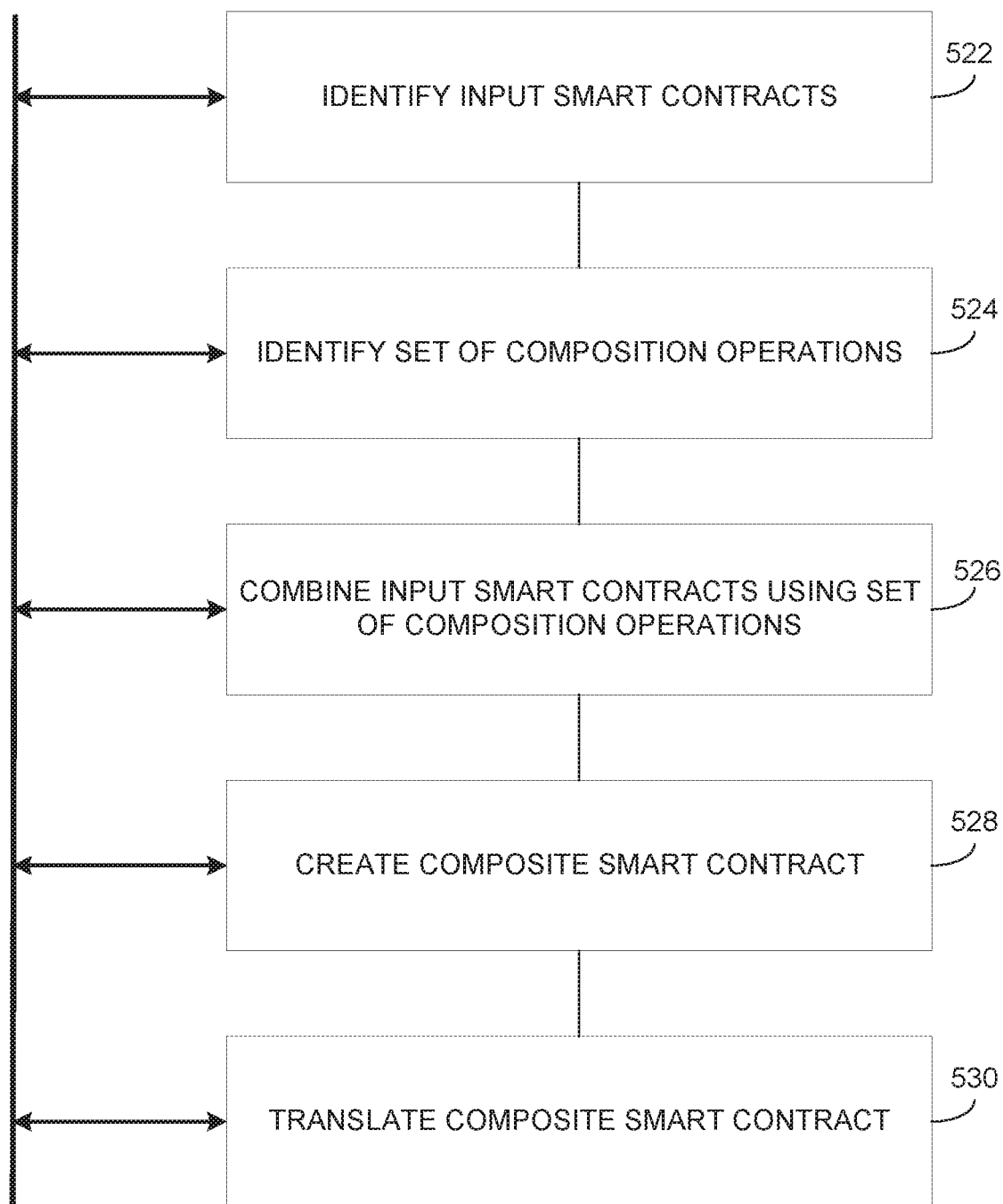
FIG. 5B illustrates a flow diagram of an example method of utilizing contract composition operators in a blockchain, according to example embodiments.

FIG. 5B illustrates a flow diagram of an example method of utilizing contract composition operators in a blockchain, according to example embodiments. Referring to FIG. 5B, the method 520 may include one or more steps as described herein and with respect to FIG. 1C.

At block 522, one or more input smart contracts 152 are identified. Each of the input smart contracts 152 include a contract specification 154, which includes a regular event pattern 122 and one or more formulas 124 that each include a temporal constraint (i.e. time limitation) the corresponding input smart contract 152 must satisfy.

At block 524, a set of composition operations 156 applicable to the one or more input smart contracts 152 and contract specifications 154 are identified. The composition operations 156 include sequence, choice, and loop operations.

At block 526, the one or more input smart contracts 152 are combined, using the set of composition operations 156. When combining two smart contracts c1 and c2 using one of the composition operators 156, their protocols 122 (event patterns) are combined in the same way, while their properties 124 ($LDL_f$ formulas) are substituted and merged.

At block 528, a computing system 190 creates the composite smart contract 158 based on the one or more input smart contracts 152 and set of composition operations 156.

At block 530, the computing system 190 translates the composite smart contract 158 into a deterministic finite automaton 136 and then an executable blockchain smart contract 138.

Figure 5C:
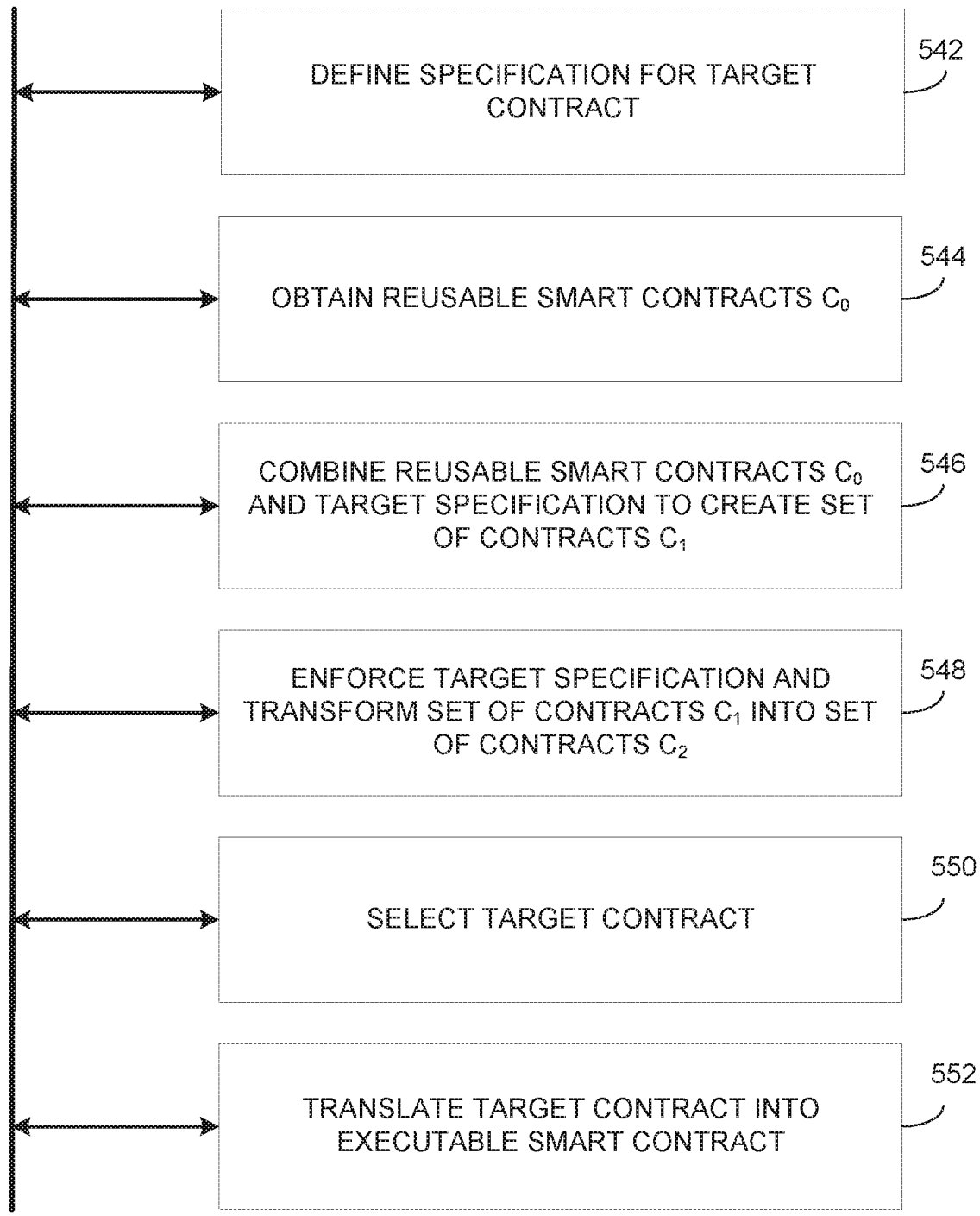
FIG. 5C illustrates a flow diagram of an example method of automatic smart contract generation in a blockchain, according to example embodiments.

FIG. 5C illustrates a flow diagram of an example method 540 of automatic smart contract generation in a blockchain, according to example embodiments. Referring to FIG. 5C, the method 540 may include one or more steps as described herein and with respect to FIG. 1D.

At block 542, a target specification 178 is defined for a new target smart contract. The target specification 178 includes a protocol 122 and properties 124.

At block 544, a plurality of reusable smart contracts 174 are obtained. Each reusable smart contract 174 includes a reusable event pattern 176.

At block 546, the plurality of reusable smart contracts 174 are combined with the target specification 178 in order to produce a set of contracts $C_1$ 182.

At block 548, on each contract in the set of contracts C i 182, the target specification 178 is enforced, and the set of contracts $C_1$ 182 are transformed into a set of contracts $C_2$ 184.

At block 550, a target contract 186 is selected from the set of contracts $C_2$ 184.

Finally, at block 552, the target contract 186 is translated into an executable smart contract 138. In one embodiment, the target contract 186 is first translated into a deterministic finite automaton 136 and the deterministic finite automaton 136 is then translated into the executable smart contract 138.

Figure 6A:
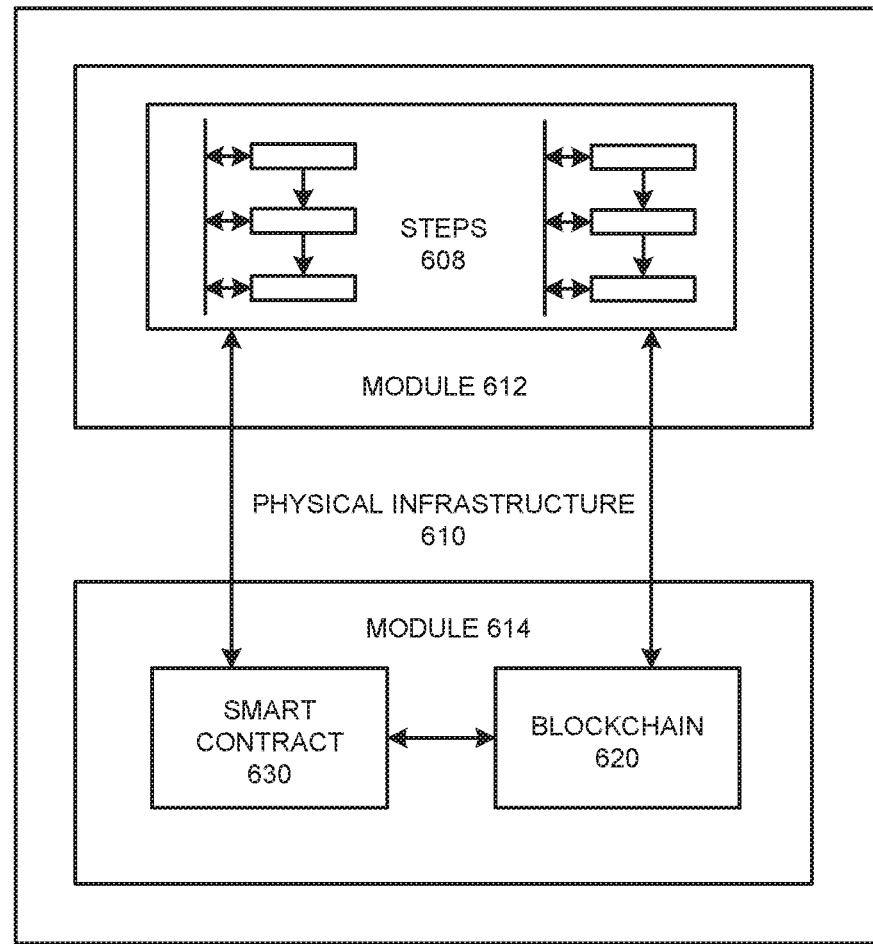
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
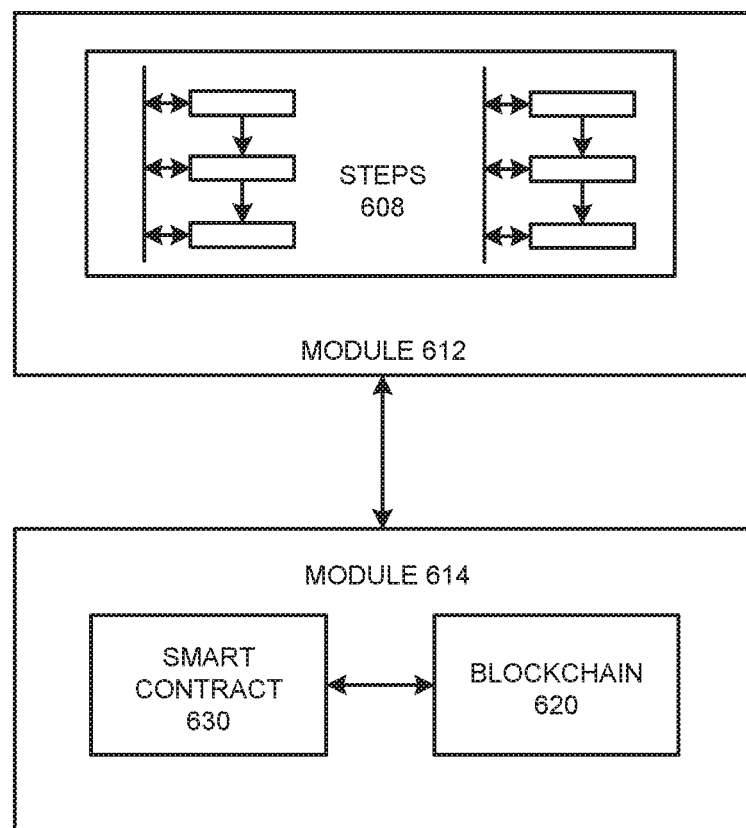
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
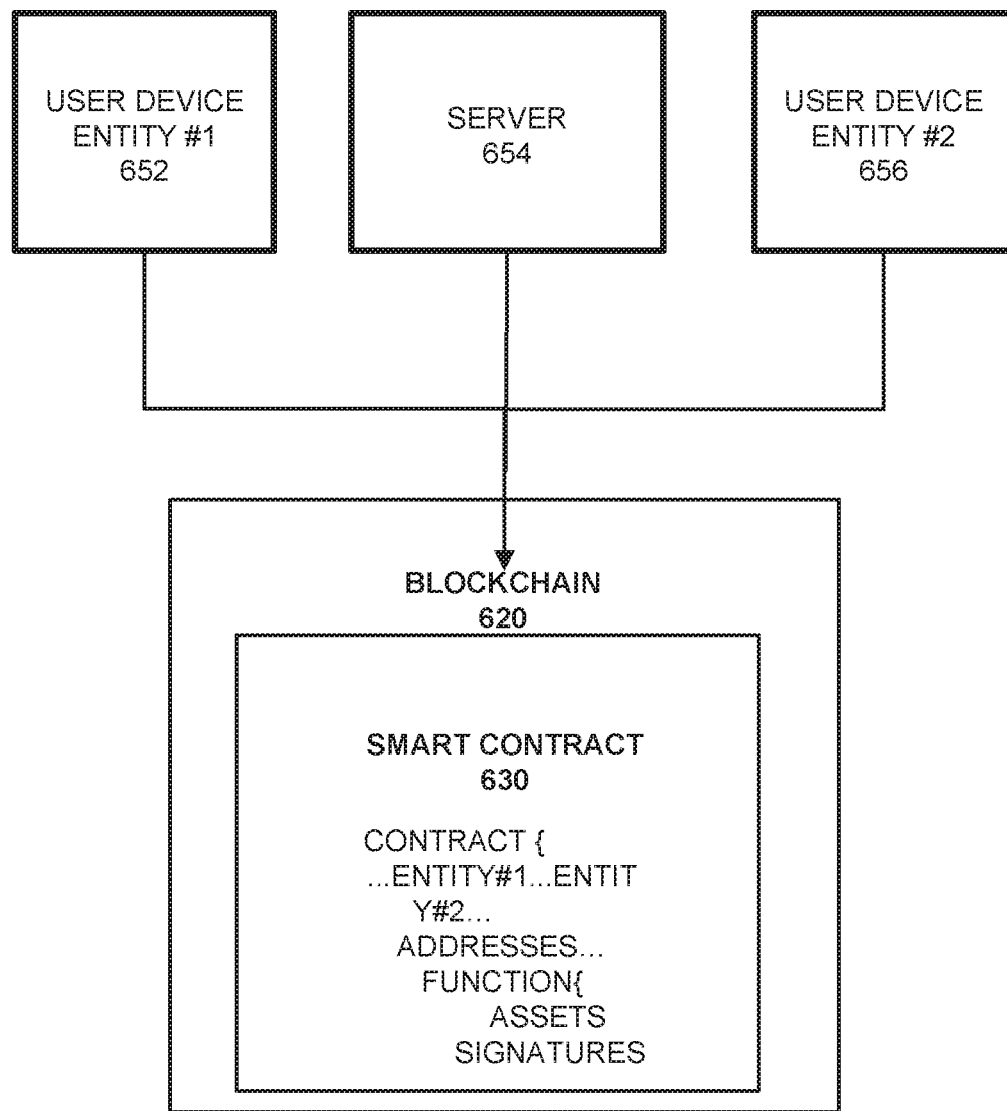
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
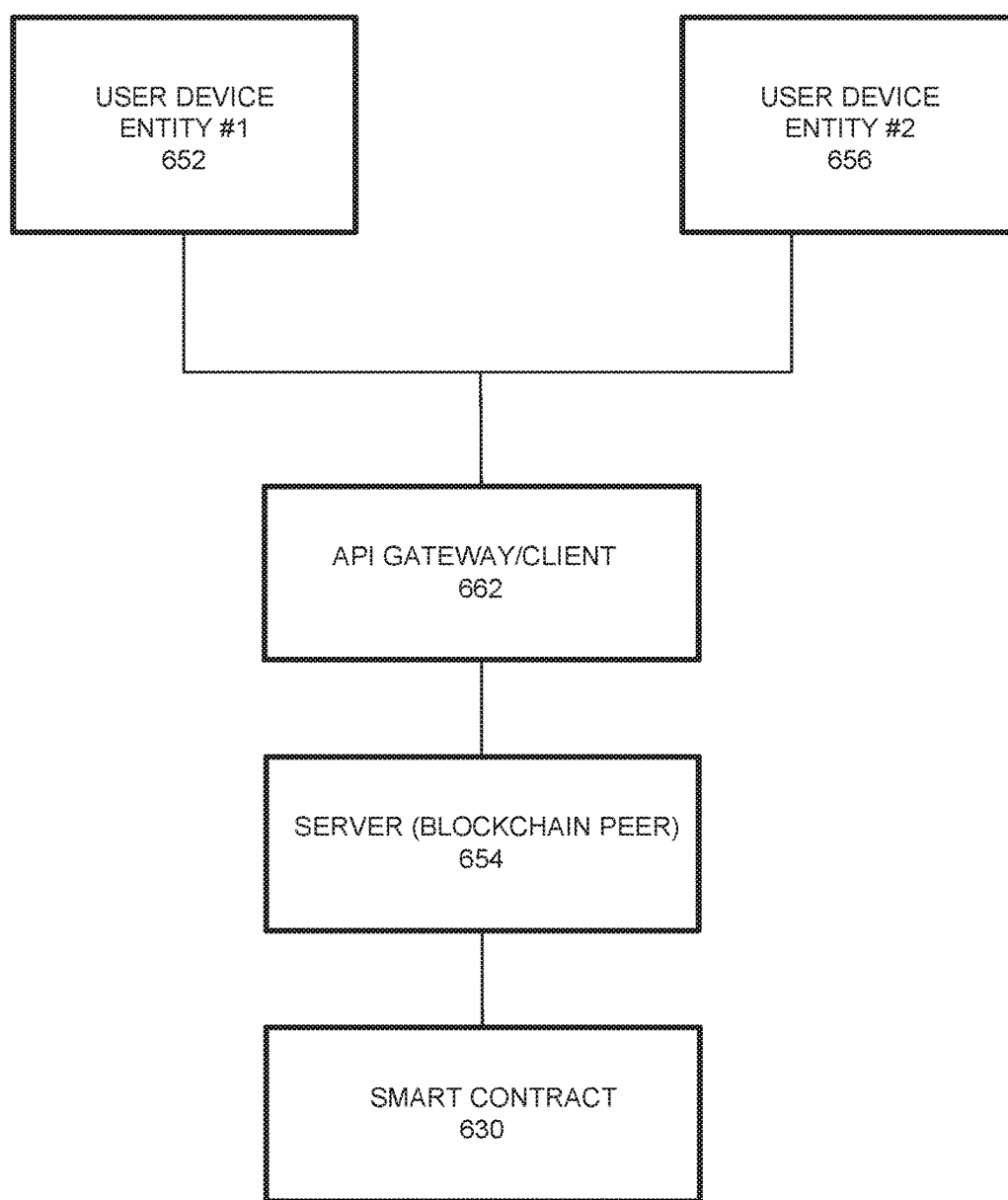
FIG. 6D illustrates an additional example system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7A illustrates an example computer system architecture 700, which may represent or be integrated in any of the above-described components, etc.

Figure 7A:
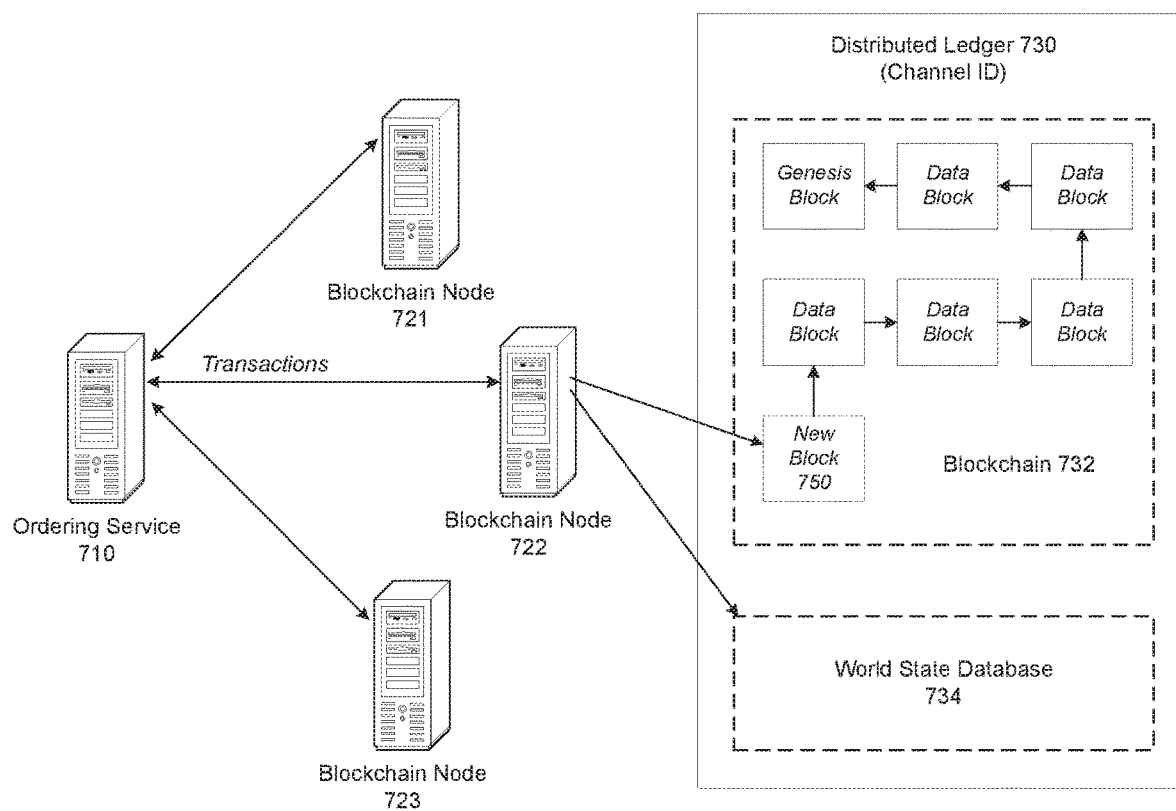
FIG. 7A illustrates a process of new data being added to a database, according to example embodiments.
Figure 7B:
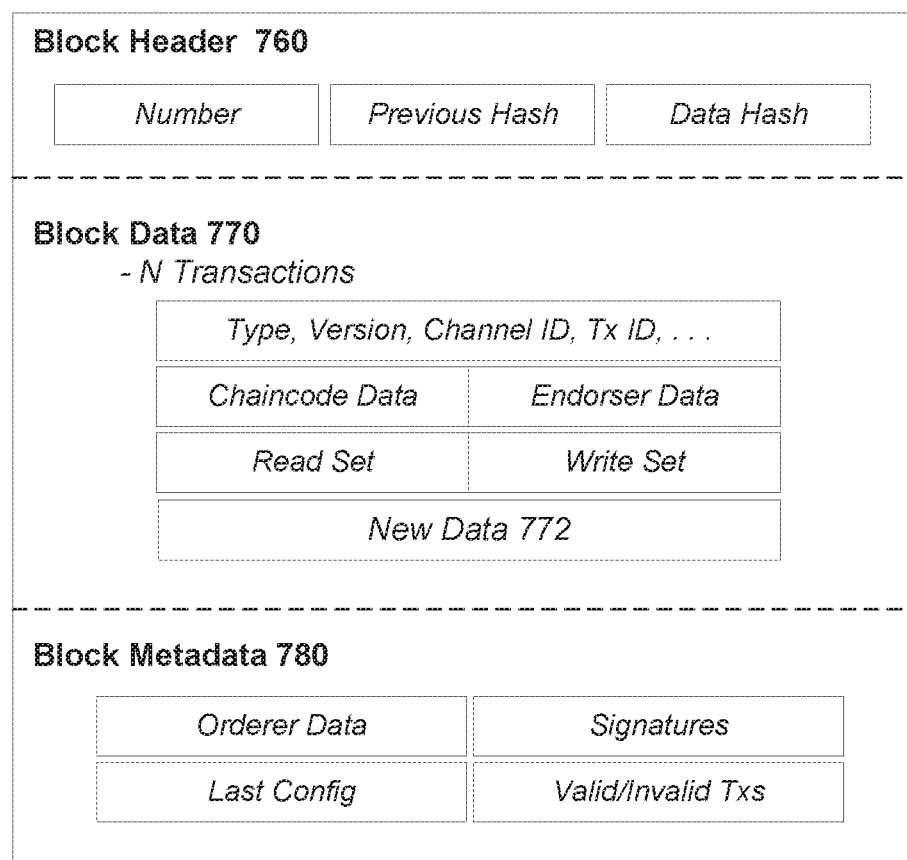
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before $\phi$. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes create a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, event/transition/state information that derive from State Chart Extensible Markup Language (SCXML), and the like. The transaction data may be stored for each of the N transactions.

In some embodiments, the block data 770 may also store new data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
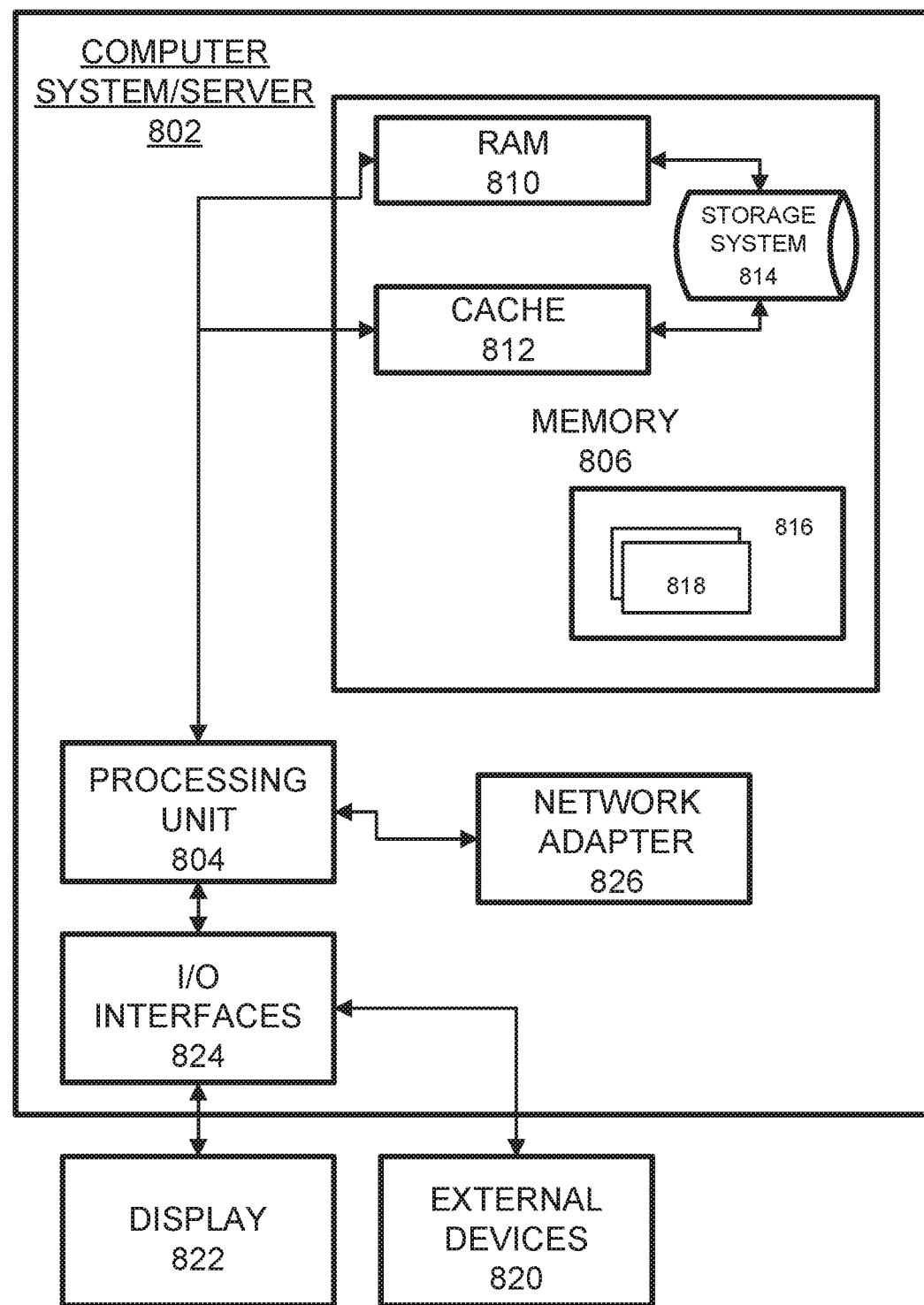
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a processor configured to:
identify a plurality of smart contracts that each include a contract specification;
identify a set of composition operations applicable to the plurality of smart contracts and contract specifications;
combine the plurality of smart contracts using the set of composition operations;
create a composite smart contract based on the plurality of smart contracts and the set of composition operations; and
translate the composite smart contract into an executable blockchain smart contract.

2. The system of claim 1, wherein the composite operations comprise one or more of sequence, choice, and loop operations, wherein the sequence operations comprise an execution by the computing system of two input smart contracts in a defined sequence, the choice operations comprise a connection by the computing system of two input smart contracts in a disjunctive fashion, and the loop operations comprise an execution by the computing system of a specified input smart contract a designated number of times.

3. The system of claim 1, wherein the plurality of smart contracts comprise a first input contract and a second input contract, and the composition operations comprise guard formulas that designate whether a rule portion originates from the first input contract or the second input contract.

4. The system of claim 1, wherein the plurality of smart contracts comprise one or more contract rules that each include an event, a condition, and a sequence of one or more actions.

5. The system of claim 4, wherein the executable blockchain smart contract comprises the event, the condition, and the sequence of one or more actions.

6. The system of claim 4, wherein the condition comprises a Linear Dynamic Logic on finite traces formula.

7. The system of claim 4, wherein the condition and the sequence of one or more actions define implementation details for the contract rules.

8. A method, comprising:
identifying a plurality of smart contracts that each include a contract specification;
identifying a set of composition operations applicable to the plurality of smart contracts and contract specifications;
combining the plurality of smart contracts using the set of composition operations;
creating a composite smart contract based on the plurality of smart contracts and the set of composition operations; and
translating the composite smart contract into an executable blockchain smart contract.

9. The method of claim 8, wherein the composite operations comprise one or more of sequence, choice, and loop operations, wherein the sequence operations comprise executing two input smart contracts in a defined sequence, the choice operations comprise disjunctively connecting two input smart contracts, and the loop operations comprise executing a specified input smart contract a designated number of times.

10. The method of claim 8, wherein the plurality of smart contracts comprise a first input contract and a second input contract, and the composition operations comprise guard formulas designating whether a rule portion originates from the first input contract or the second input contract.

11. The method of claim 8, wherein the plurality of smart contracts comprise one or more contract rules that each include an event, a condition, and a sequence of one or more actions.

12. The method of claim 11, wherein the executable blockchain smart contract comprise the event, the condition, and the sequence of one or more actions.

13. The method of claim 11, wherein the condition comprises a Linear Dynamic Logic on finite traces formula.

14. The method of claim 11, wherein the condition and the sequence of one or more actions define implementation details for the contract rules.

15. A non-transitory computer readable medium comprising instructions, that when read by a processor, cause the processor to perform:
identifying a plurality of smart contracts that each include a contract specification;
identifying a set of composition operations applicable to the plurality of smart contracts and contract specifications;
combining the plurality of smart contracts using the set of composition operations;
creating a composite smart contract based on the plurality of smart contracts and the set of composition operations; and
translating the composite smart contract into an executable blockchain smart contract.

16. The non-transitory computer readable medium of claim 15, wherein the composite operations comprise one or more of sequence, choice, and loop operations, wherein the sequence operations comprise executing two input smart contracts in a defined sequence, the choice operations comprise disjunctively connecting two input smart contracts, and the loop operations comprise executing a specified input smart contract a designated number of times.

17. The non-transitory computer readable medium of claim 15, wherein the plurality of smart contracts comprise a first input contract and a second input contract, and the composition operations comprise guard formulas designating whether a rule portion originates from the first input contract or the second input contract.

18. The non-transitory computer readable medium of claim 15, wherein the plurality of smart contracts comprise one or more contract rules that each include an event, a condition, and a sequence of one or more actions.

19. The non-transitory computer readable medium of claim 18, wherein the executable blockchain smart contract comprises the event, the condition, and the sequence of one or more actions.

20. The non-transitory computer readable medium of claim 18, wherein the condition comprises a Linear Dynamic Logic on finite traces formula.

21. The non-transitory computer readable medium of claim 18, wherein the condition and the sequence of one or more actions define implementation details for the contract rules.

22. A method, comprising:
    identifying a plurality of smart contracts that each include a contract specification;
    identifying a set of composition operations applicable to the plurality of smart contracts and contract specifications;
    combining the plurality of smart contracts using the set of composition operations;
    creating a composite smart contract based on the plurality of smart contracts and the set of composition operations;
    converting the composite smart contract to a deterministic finite automaton; and
    converting the deterministic finite automaton into an executable form of a blockchain smart contract.

23. The method of claim 22, wherein the composite operations comprise one or more of sequence, choice, and loop operations, wherein the sequence operations comprise executing two input smart contracts in a defined sequence, the choice operations comprise disjunctively connecting two input smart contracts, and the loop operations comprise executing a specified input smart contract a designated number of times.

24. The method of claim 22, wherein the plurality of smart contracts comprise one or more contract rules that each include an event, a condition, and a sequence of one or more actions.

25. A non-transitory computer readable medium comprising instructions, that when read by a processor, cause the processor to perform:
    identifying a plurality of smart contracts that each include a contract specification;
    identifying a set of composition operations applicable to the plurality of smart contracts and contract specifications;
    combining the plurality of smart contracts using the set of composition operations;
    creating a composite smart contract based on the plurality of smart contracts and the set of composition operations;
    converting the composite smart contract to a deterministic finite automaton; and
    converting the deterministic finite automaton into an executable form of a blockchain smart contract.

* * * * *